US012703324B2

(12) United States Patent
Kanala et al.

(10) Patent No.: US 12,703,324 B2
(45) Date of Patent: Aug. 11, 2026

(54) SYSTEM AND METHOD FOR PERFORMING ON-BOARDING OF END DEVICES OF VEHICLES

(71) Applicant: Wipro Limited, Bangalore (IN)

(72) Inventors: Kishore Reddy Krishna Kanala, Bengaluru (IN); Chandra Sekhar Chaudhuri, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 134 days.

(21) Appl. No.: 18/677,232

(22) Filed: May 29, 2024

(65) Prior Publication Data

US 2025/0304010 A1 Oct. 2, 2025

(30) Foreign Application Priority Data

Mar. 28, 2024 (IN) ............................ 202441025720

(51) Int. Cl.
*B60R 25/30* (2013.01)

(52) U.S. Cl.
CPC ...... *B60R 25/307* (2013.01); *B60R 2325/108* (2013.01)

(58) Field of Classification Search
CPC ............ B60R 25/307; B60R 2325/108; H04L 63/0869; H04L 63/0876; H04L 2463/082; H04L 63/08; G06F 21/445
See application file for complete search history.

(56) References Cited

U.S. PATENT DOCUMENTS 10,771,263 B2 9/2020 Smith et al.
2018/0123804 A1 5/2018 Smith et al.
(Continued)

FOREIGN PATENT DOCUMENTS

AU 2010314480 A1 * 6/2012 ............ H04W 12/06
CN 117221010 B 1/2024
(Continued)

OTHER PUBLICATIONS

“Security requirements for external interfaces and devices with vehicle access capability: Recommendation ITU-T X.1374” International Telecommunication Union, Oct. 2020, 28 pages.
(Continued)

*Primary Examiner* — Brian Whipple
(74) *Attorney, Agent, or Firm* — Finnegan, Henderson, Farabow, Garrett & Dunner, LLP

(57) ABSTRACT

Disclosed herein is a method and system for performing onboarding of at least one end device of a vehicle. The method comprising performing a multi-level authentication of the at least one end device, by: performing a first level two-way authentication between the vehicle and the at least one end device; performing a second level authentication of the at least one end device, through the vehicle, by an Original Equipment Manufacturer (OEM) cloud; and performing a third level authentication of the at least one end device, by the OEM cloud and a vehicle owner. Thereafter, the method comprising installing software components related to at least one end device from the OEM cloud to the vehicle based on determining availability of the software components in the OEM cloud for onboarding the at least end device in the vehicle upon performing the multi-level authentication of the at least one end device.

17 Claims, 11 Drawing Sheets

(56) References Cited

U.S. PATENT DOCUMENTS

2018/0343238 A1* 11/2018 Tola .................... H04L 67/1095
2019/0359173 A1* 11/2019 Pudar .................... B60R 25/209
2021/0390800 A1* 12/2021 Chafekar ................ B60L 53/16

FOREIGN PATENT DOCUMENTS

JP 2020088836 A 6/2020
WO 2023/232045 A1 12/2023

OTHER PUBLICATIONS

Preet Kang, "Software-Defined Vehicle Architectures," Industry Insights, Sep. 2023.
"Battery Authentication and Security Schemes," Texas Instruments, Application Report, SLUA346A—Jul. 2005—Revised Aug. 2014.
Chatterjee et al., "Building PUF Based Authentication and Key Exchange Protocol for IoT Without Explicit CRPs in Verifier Database," IEEE, 2018, 14 pages.
Extended European Search Report in European Application No. 25157530.4, dated Mar. 21, 2025, 50 pages.

* cited by examiner

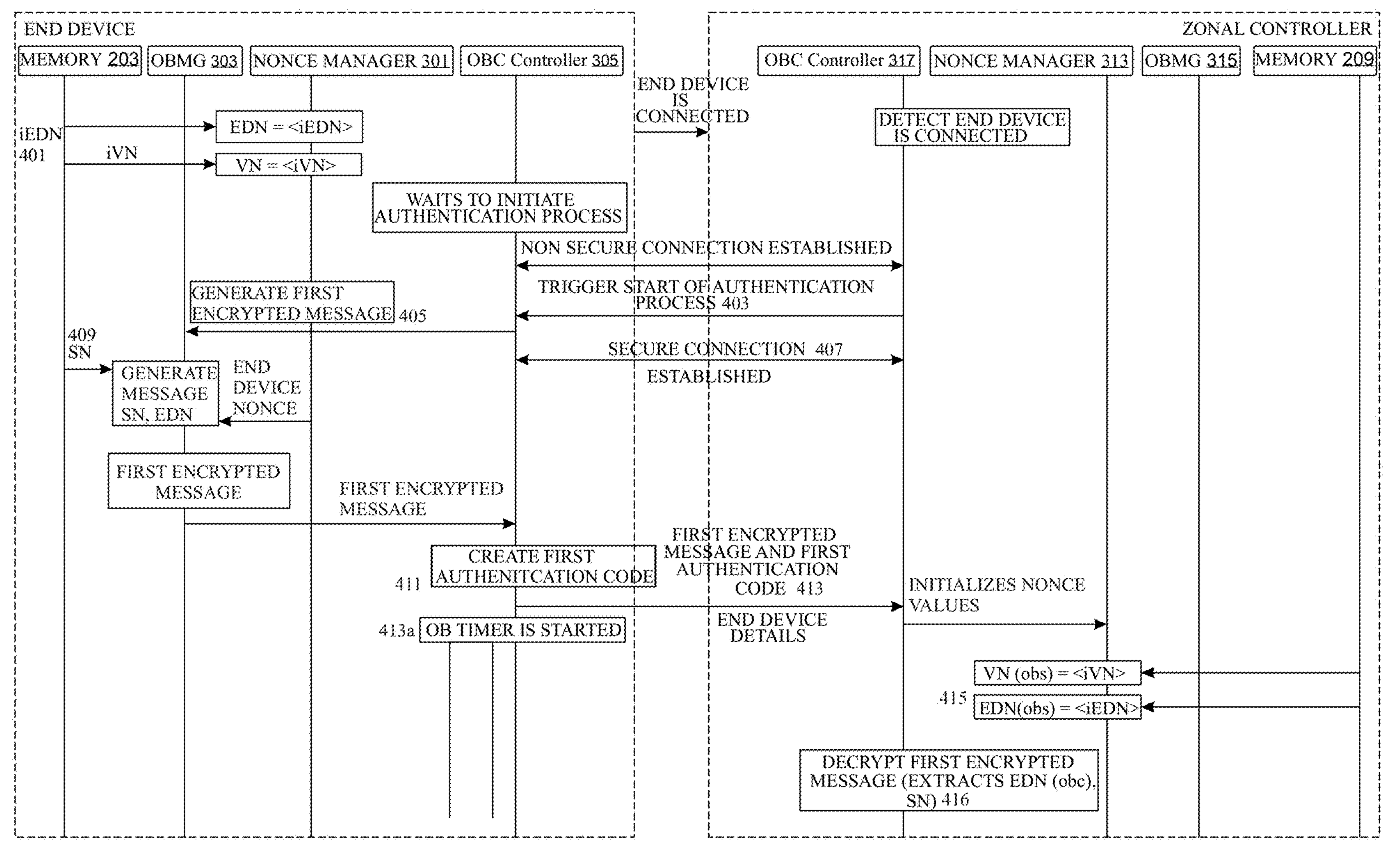
Fig. 4A (process steps 401-416)

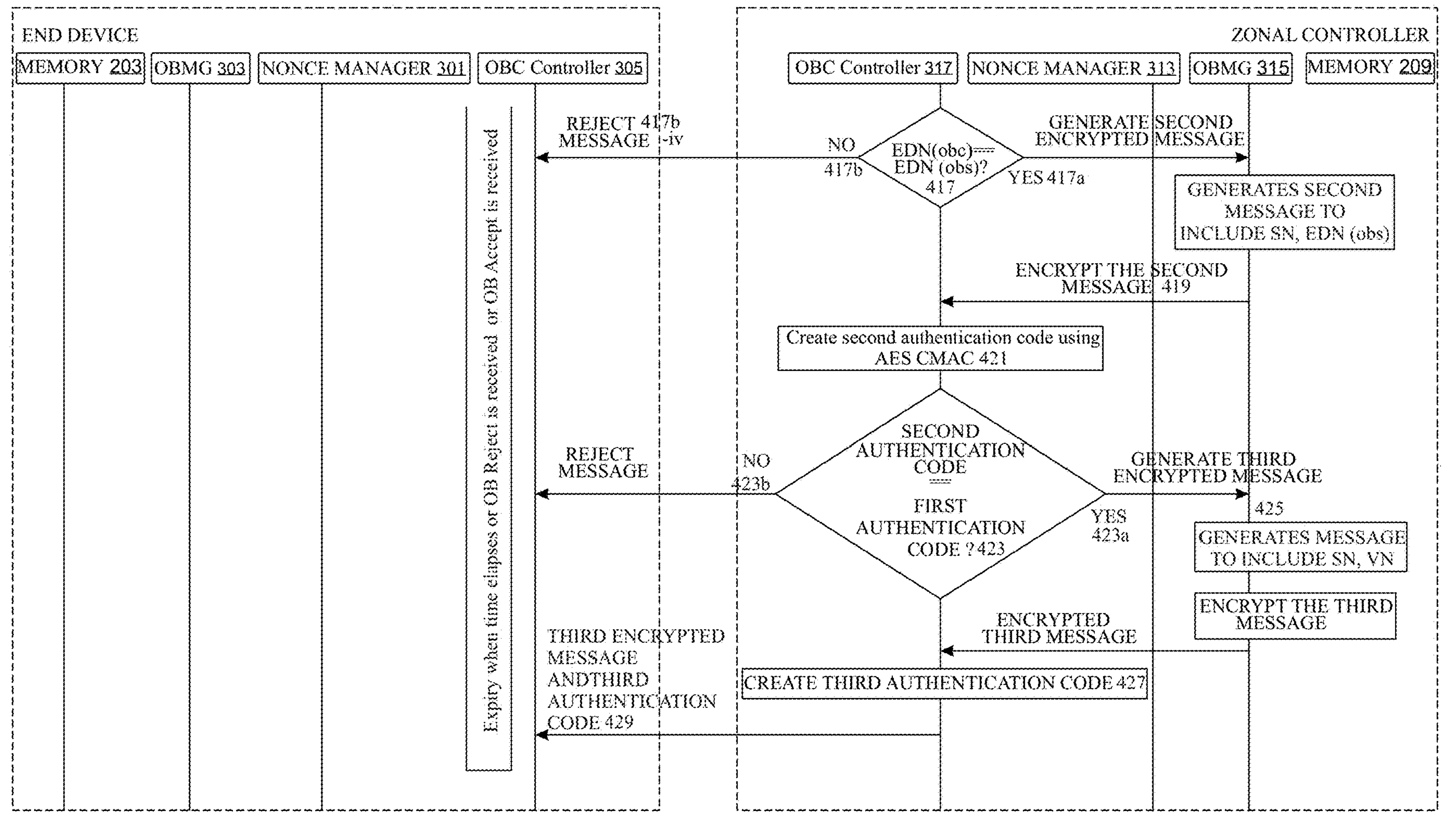
Fig. 4B (process steps 417-429)

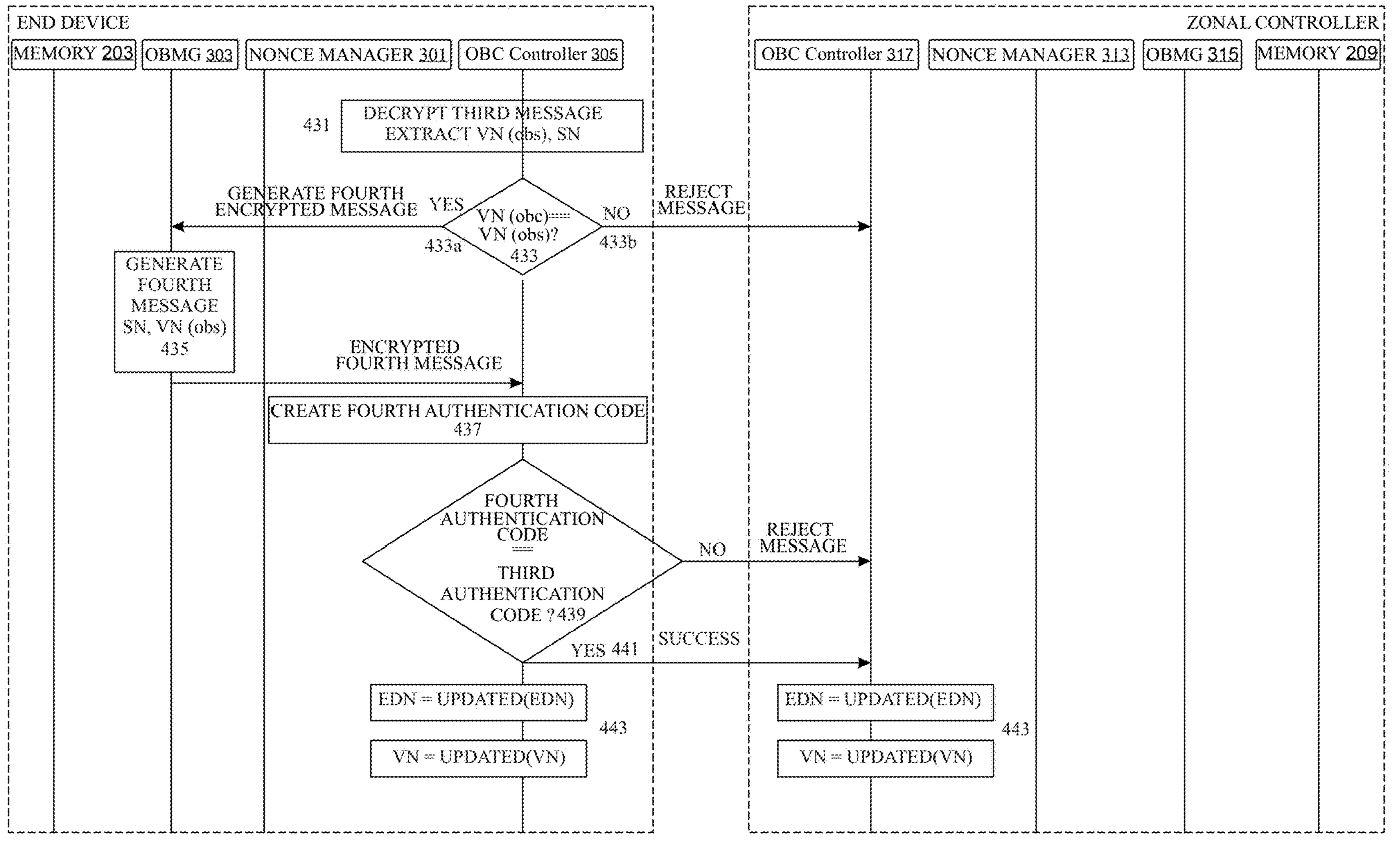
Fig. 4C (process steps 431-443)

SYSTEM AND METHOD FOR PERFORMING ON-BOARDING OF END DEVICES OF VEHICLES

TECHNICAL FIELD

The present disclosure generally relates to onboarding of end devices of vehicles and in particular relates to a system and method for performing on-boarding of end devices of vehicles.

BACKGROUND

The following description includes information that may be useful in understanding the present disclosure It is not an admission that any of the information provided herein is prior art or relevant to the presently claimed disclosure, or that any publication specifically or implicitly referenced is prior art.

Recently there has been tremendous growth in the automobile industry in providing software defined vehicles (SDVs). A Software Defined Vehicle (SDV) is a vehicle whose functionality and features are managed and updated either partially or completely through software during its lifetime. The SDV is enabled by a next generation of automotive architecture called Zonal Electrical/Electronics (E/E) architecture. In the Zonal E/E architecture 100, each of the end device 101 is connected to a zonal controller 103 and processing happens in the corresponding zonal controller (also referred to as zonal gateway) 103 as well as on a computing unit 105 or a centralized high-performance computing unit (HPC) as shown in FIG. 1. The vehicle 102 is equipped with the zonal controllers 103 on front left end, front right end, rear left end, and rear right end of the vehicle 102. It may be worth noting that though only four zonal controllers 103 are shown, there can be any number of zonal controllers equipped in the vehicle 102 to perform the desired functionality. Further, the computing unit 105 of the vehicle 102 is connected to the OEM cloud 105 to determine whether the end device 101 is from authorized end device manufacturer.

One of the key characteristics of the SDVs is updatability of both software and hardware components. This means, the SDVs need to support new additional end devices or device updates during the lifetime of the vehicle 102. Examples of such end devices may comprise cameras, sensor devices, other ECUs, battery packs, actuators etc. During the life of the vehicle 102 on road, they will require 'Features on demand'. For example, heated seats or latest steering wheels may be booked at any time post purchase of the vehicle 102 provided the end device hardware is already installed on the vehicle or the end device hardware can be retrofitted to the vehicle 102. As such, SDVs are expected to refresh themselves with new features.

There are two categories of such features-one in which new feature doesn't involve upgraded or new end device (like upgraded ECU, sensor or actuator) and only software update of the end device brings in the new feature. The second category involves upgraded or new end device installation where authentication of the end device would be required.

At present many Original Equipment Manufacturers (OEMs) are taking care of adding new features where the end device support is already available. Used herein, "OEM" is a company that manufactures the vehicle (SDV). There will be scenarios where there will be a new software version of the same end device. The new version may be capable of supporting additional features in software. Further, there will be scenarios where there will be a need to add a totally new end device to keep vehicle up-to-date in market. Since the update or adding an end device is supported by SDV, there is need of a method to authenticate them before those new/upgraded end devices can start communicating with other components in the vehicle. Therefore, the new end device will need software packages to be added.

However, currently there is no solution available to download the software automatically related to the new end device added to the vehicle. Currently, software in vehicles is moving from being static functional components to a set of services that can be independently updated or added Over-The-Air (OTA) after vehicle gets on to the road. This enables OEMs to decide the price of the vehicles based on software services that are deployed in the vehicle, thus making capabilities of vehicles defined by software. The majority of future vehicles are expected to be software defined vehicles (SDVs).

Conventionally, in existing solutions, most end devices are either pre-built in the vehicle or are added/updated by authorized service centers or by Original Equipment Manufacturers (OEMs) by checking if they are from authorized end device manufacturer. There are some mechanisms that are available for authenticating end devices/peripherals before they are used within the vehicle. These are following:

1. No authentication approach: In this approach it is assumed that the end device is from an authentic source. This is a risky approach as any end device can get connected to the vehicle and can lead to security challenges.
2. Serial number/ID based authentication: In this approach, Serial number/ID is provided by the end device to the vehicle for validation. If the Serial number/ID is valid, then the end device is accepted, else, authentication is denied. One of the problems with this approach is that since the serial number/ID is a constant/fixed string, if it is found out by hacker through some means such as logs or analyzing memory, this can be used to get access to the vehicle in the subsequent sessions. Moreover, in this approach, authentication is only one way i.e., the end device is authenticated by the vehicle.
3. Challenge-response based authentication: In this approach, the end device (responder) requests the vehicle (challenger) to send a challenge i.e., a random number value. This random number is sent to the responder by the challenger. The challenger and the responder independently encrypt the random number using a pre-stored secret key on both sides to generate encrypted values (EV-ch, EV-resp) respectively. The responder sends the EV-resp to the challenger for comparing it with the EV-ch. If they match, then end device is accepted, else, it is not authenticated. The first problem with this approach is that it is also one way i.e., the end device is authenticated by the vehicle. The second problem with this approach is that authentication is dependent on only value (that is, challenge) which may be risky as hackers may find ways to guess the challenge. Third problem is that challenge-response pair may get compromised. Also, existing authentication mechanisms do not address the need of OEM and vehicle owner approving the end device before it is used.

Further, the existing authentication mechanisms (mentioned above) are decentralized where each end device is authenticated by a corresponding component such as Zonal controller and/or HPC on the vehicle. This kind of decentralized approach doesn't give OEM of the vehicle flexibility to manage authentication mechanisms.

However, the existing solutions (as mentioned above) fail to disclose anything regarding multi-level authentication for onboarding of end device in vehicles. Further, the existing solution also fails to disclose usage of nonce with additional security and to take vehicle owner's confirmation before onboarding the end device in the vehicle. Furthermore, the existing solution fails to include mutual authentication of the end device and the vehicle and checking for software installation for onboarding the end device in the vehicles.

Thus, there exists a need for an improved method and system for performing onboarding of end devices of vehicles, which overcomes the above-mentioned limitations of the conventional methods.

The above-mentioned drawbacks/difficulties/disadvantages of the conventional techniques are explained just for exemplary purpose and this disclosure and description mentioned below would never limit its scope only such problem. A person skilled in the art may understand that this disclosure and below mentioned description may also solve other problems or overcome the above-mentioned drawbacks/disadvantages of the conventional arts which are not explicitly captured above.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a method of performing onboarding of at least one end device is disclosed. The method comprises performing a multi-level authentication of the at least one end device, by performing: a first level two-way authentication between the vehicle and the at least one end device, a second level authentication of the at least one end device, through the vehicle, by an Original Equipment Manufacturer (OEM) cloud. Thereafter, the method comprising a third level authentication of the at least one end device, by the OEM cloud. Finally, the method comprising installing software components related to at least one end device from the OEM cloud to the vehicle based on determining availability of the software components in the OEM cloud for onboarding the at least one end device in the vehicle.

In one non-limiting embodiment of the present disclosure, a method of performing onboarding of at least one end device of a vehicle is disclosed. The method comprises performing a first level two-way authentication between the vehicle and the at least one end device. Thereafter, the method comprises upon performing the multi-level authentication of the at least one end device, installing software components related to at least one end device from the OEM cloud to the vehicle based on determining availability of the software components in the OEM cloud for onboarding the at least end device in the vehicle.

In one non-limiting embodiment of the present disclosure, a system for performing onboarding of at least one end device of a vehicle is disclosed. The system comprises a computing unit of the vehicle, at least one end device coupled to the computing unit, and an Original Equipment Manufacturer (OEM) cloud coupled to the vehicle. The system is configured to perform a multi-level authentication of the at least one end device, by performing a first level two-way authentication between the vehicle and the at least one end device. Further, the system is configured to perform a multi-level authentication of the at least one end device, by performing a second level authentication of the at least one end device, through the vehicle, by the OEM cloud. Thereafter, the system is configured to perform a multi-level authentication of the at least one end device, by performing a third level authentication of the at least one end device, by the OEM cloud. At last, the system is configured to upon performing the multi-level authentication of the at least one end device, install software components related to at least one end device from the OEM cloud to the vehicle based on determining availability of the software components or the software update in the OEM cloud for onboarding the at least one end device in the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which:

FIGS. 4A, 4B and 4C illustrate a sequence diagram for performing a first level two-way authentication for performing onboarding of end device of vehicle, for implementing embodiments consistent with the present disclosure;

Figure 1:
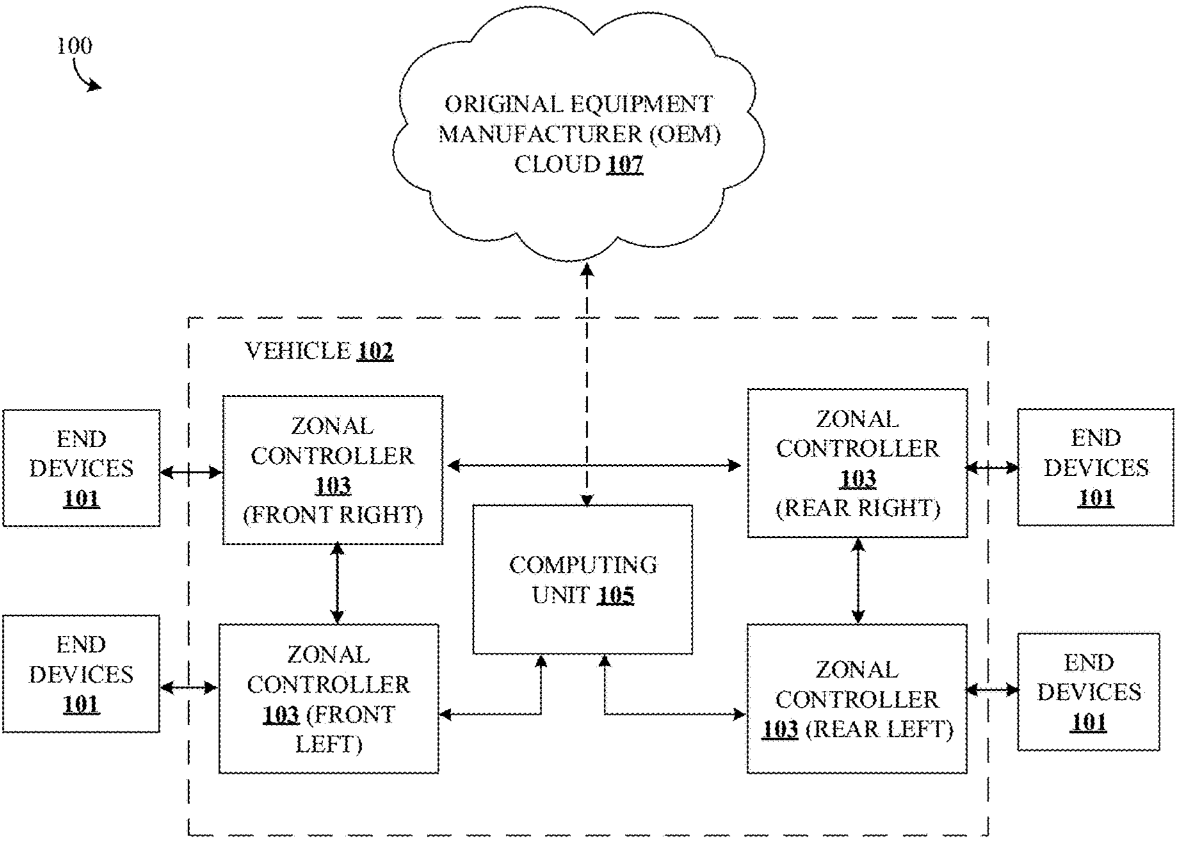
FIG. 1 shows an example software defined vehicle (SDV) Zonal Electrical/Electronic architecture, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present disclosure.

The present disclosure is directed to a method and system for performing onboarding of end devices of software defined vehicles (SDVs) by performing multi-level authentication of the end devices. For performing the multi-level authentication of the end devices, the method performs a first level two-way authentication between the vehicle 102 and the end devices based on nonce values. Further, the method performs a second level authentication of the end devices, through the vehicle by an Original Equipment Manufacturer (OEM) cloud. Further, the method performs a third level authentication of the end devices by the OEM cloud 107 using vehicle owner approval mechanism. Thereafter, upon performing the successful multi-level authentication, the method performs installation of software components related to the end devices from the OEM cloud 107 to the vehicle based on determining availability of the software components in the OEM cloud 107. If the software components are available in the OEM cloud 107, the OEM cloud 107 transmits a Uniform Resource Indicator for downloading and installing the software components related to the end devices to the vehicle. If the software components are not available in the OEM cloud 107, the OEM cloud 107 transmits an error message to the end devices via the vehicle. Thus, the present disclosure allows secure onboarding of end devices of vehicles by performing multi-level authentication of the end devices. Also, the present disclosure provides an improved method for authenticating the end devices before onboarding the end devices in the vehicles. Used herein, the term "onboarding" refers to integrating the end devices into the SDVs and enabling the end devices to function seamlessly within the vehicle's software-centric architecture. Additionally, the present disclosure provides a method for automatically determining availability of software components related to end devices and installing the software components from the OEM cloud 107 if the software components are available. In other words, onboarding process may involve: software installation to ensure communication between the end devices and the SDVs. In one example, while onboarding a new camera into the SDV, the system will check and install software packages such as: camera drivers, firmware, middleware, and camera Application Program Interface (API), and update SDV middleware for integrating the camera middleware with SDV.

Figure 2:
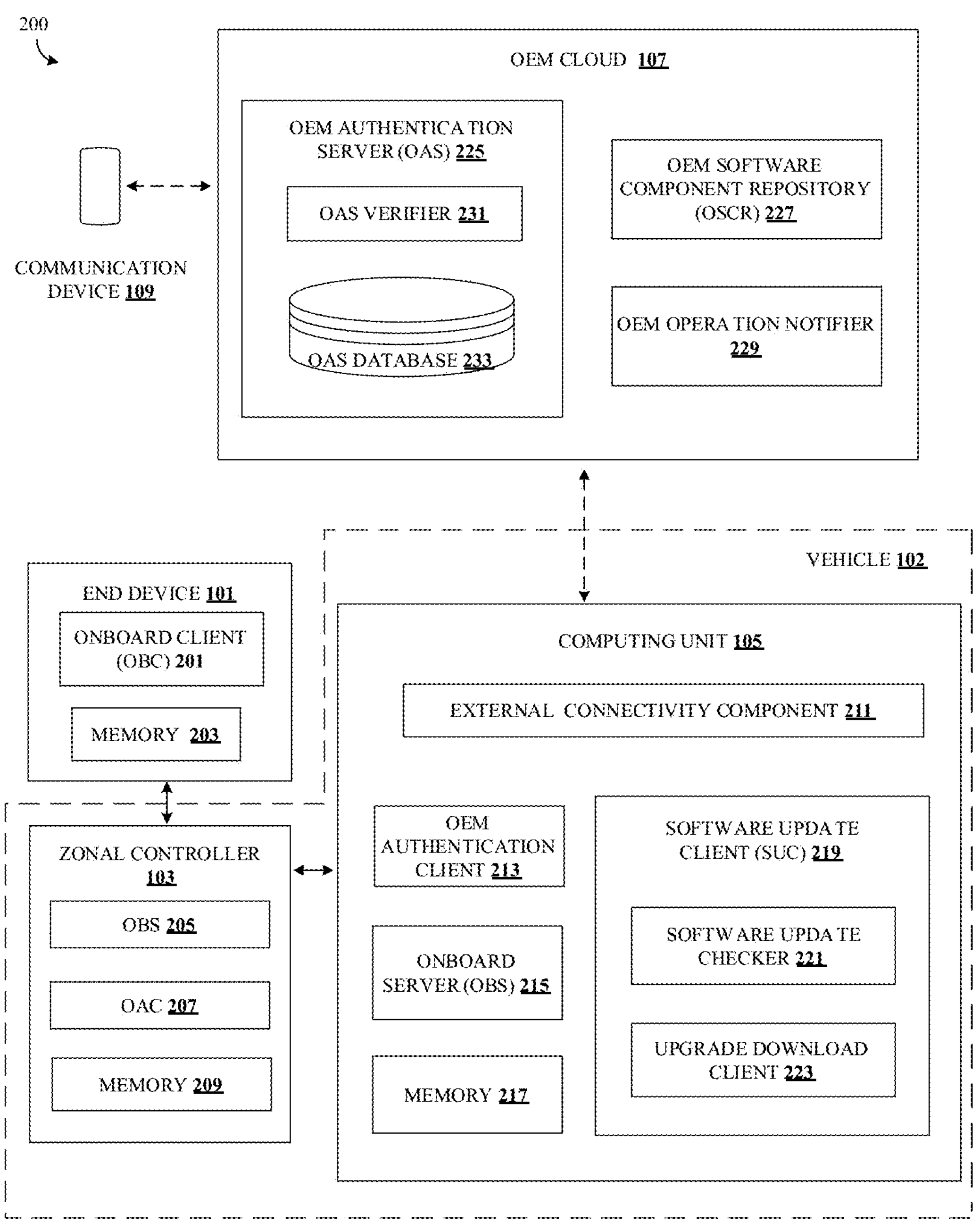
FIG. 2 shows an exemplary architecture for performing onboarding of end devices of vehicles, in accordance with an embodiment of the present disclosure.

FIG. 2 shows an exemplary architecture of a system for performing onboarding of end devices 101 of vehicles 102, in accordance with an embodiment of the present disclosure. The system may be any suitable vehicle environment in which onboarding of end devices 101 may be performed by performing multi-level authentication. The system may comprise end devices 101, zonal controllers 103, a computing unit 105, an OEM cloud 107, and a communication device 109. However, the architecture may comprise additional components or devices based on requirements. In some embodiments, the system may be configured to perform the desired functionality of the present disclosure. In another embodiment, the system may comprise one or more components configured to perform the desired functionality of the present disclosure. In an embodiment, the end devices 101 may comprise, but not limited to, cameras, sensors, electronic control unit, battery packs, actuators, etc., to be onboarded on the vehicle 102. In one embodiment, one or more end device 101 may be onboarded to the vehicle 102. In some embodiments, the vehicle 102 may be a two-wheeler, a three-wheeler, or four-wheeler, or any vehicle this architecture is applicable. In some embodiments, the vehicle 102 may be an autonomous vehicle, a semi-autonomous vehicle, a hybrid vehicle, or alike which may include software defined components. In an embodiment, the end devices 101 may be configured as an external device connected to the zonal controllers 103 of the vehicle 102. Each of the end devices 101 may be connected to a corresponding zonal controller 103 as shown in FIG. 2. In an alternative embodiment, the end devices 101 may be configured internally within the vehicle 102 and connected to the zonal controllers 103. Based on requirements, the end devices 101 may be added to the vehicle 102 at any time during the life of the vehicle 102.

In some embodiments, the end devices 101 may comprise components which may include, but not limited to, an Onboard Client (OBC) 201 and a memory 203 associated with the end device 101. However, there may be additional components in each of the end devices 101 discussed later in upcoming paragraphs. The OBC 201 may communicate with the vehicle 102 through the zonal controller 103 of the vehicle 102 for first level two-way authentication between the end device 101 and the vehicle 102. Once the first level two-way authentication is completed, OBC 201 shares the end device details with the vehicle 102. In another embodiment, the OBC 201 may share the end device details with the vehicle 102 during the first level two-way authentication.

In some embodiments, the memory 203 may be a secure and persistent storage for storing data such as an initial EndDeviceNonce (iEDN), a corresponding algorithm (Algo-EndDeviceNonce), and a secret key is stored. The memory 203 also stores an initial VehicleNonce (iVN) and a corresponding algorithm (Algo-OBNonce). The data is stored in the memory 203 by the end device manufacturer based on the details received from the OEM any time before onboarding the end device 101 to the vehicle 102. Further, the memory 203 may store the end device details such as end device serial number (SN), part number, manufacturer details etc., In some implementations, data may be stored within the memory 203 in the form of various data structures. Additionally, the data may be organized using data models, such as relational or hierarchical data models. The other data may include various temporary data and files generated by the OBC 201 while performing various functions of end device 101.

The architecture further shows sub-components of the zonal controller 103 which may include an Onboard server (OBS) 205, an OEM authentication client (OAC) 207, and a memory 209 which may be configured to perform desired functionality of the zonal controller 103. The desired functionality of the OBS 205 and the OAC 207 is explained in upcoming paragraphs with respect the computing unit 105 of the vehicle 102. It may be noted to a person skilled in the art that there can be multiple end devices 101 and multiple zonal controllers 103 coupled with each other, however, only one end device 101 and corresponding one zonal controller 103 coupled to each other is shown for the sake of simplicity. The zonal controller 103 is a key component of future automotive architecture called Zonal E/E architecture of SDV. It may be well appreciated by a person skilled in the art that there may be multiple zonal controllers 103 in a vehicle 102 and the end devices 101 may be connected to the at least one of the zonal controllers 103. The zonal controllers 103 are beneficial because they require minimal processing for receiving the data from the end devices 101 and transmitting the data to a computing unit 105 of the vehicle 102. A detailed explanation of the present disclosure is provided considering this scenario. In an alternative embodiment, the OBS 215 and OAC 213 may be configured to run on all the zonal controllers 103 and the end device 101 connected to respective zonal controller 103 and may utilize the OBS 215 and OAC 213 pair. In this scenario, the details of the end device 101 may not be transmitted to other zonal controllers 103. However, the memory 209 and a central processing unit (CPU) of all zonal controllers 103 may be utilized. In this scenario, the processing can happen in all the zonal controllers 103 as well. Further, each of the zonal controllers 103 may be connected to the computing unit 105 or the high-performance computing (HPC) unit of the vehicle 102.

The computing unit 105 may be referred to as a centralized computing system that takes care of the onboarding process of the end devices 101. The computing unit 105 may receive the data related to each of the end devices 101 through each of the zonal controllers 103. As used herein, the term computing unit 105 may refer to an Application Specific Integrated Circuit (ASIC), an electronic circuit, a hardware processor (shared, dedicated, or group), a Field-Programmable Gate Array (FPGA), and memory that execute one or more software or firmware programs, a combinational logic circuit, and/or other suitable components that provide the described functionality. In some embodiments, computing unit 105 may be configured to perform one or more functions of the vehicle 102 for performing onboarding of the end device 101 by performing multi-level authentication. The computing unit 105 may comprise, but not limited to, an external connectivity component 211, the OAC 213, an Onboard Server (OBS) 215, a memory 217, and a Software Update Client (SUC) 219. However, the computing unit 105 may comprise additional components which may be required to perform the desired functionality in accordance with the present disclosure.

Further, the external connectivity component 211 may be configured to facilitate a secure communication channel between the OAC 213 and the OEM cloud 107. In other words, the external connectivity component 211 may be configured to the vehicle connectivity to external entities such as the OEM cloud 107, partner cloud, etc., The OAC 213 may be used by the OBS 215 to transmit end device details and the vehicle details to the OEM cloud 107. The OAC 213 may be configured to receive response from the OEM cloud 107 based on success or failure of second level authentication and the third level authentication and transmits the response to the computing unit 105.

Furthermore, the OBS 215 may communicate with the OBC 201 of the end device 101 through the zonal controller 103 of the vehicle 102 for performing first level two-way authentication between the end device 101 and the vehicle 102. Also, the OBS 215 may interact with the OEM cloud 107 through the OAC 213 for performing the second level authentication.

In one embodiment, the memory 217 may store data such as the iVN, the corresponding algorithm (Algor-OBNonce) and the secret key. Additionally, the memory 217 may also store the iEDN and a corresponding algorithm (Algo-EndDeviceNonce). The data is stored in the memory 217 of the vehicle 102 by the OEM during the production of the vehicle 102. Further, the memory 217 may store vehicle details such as Vehicle Identifier Number (VIN), etc., In this embodiment, storing iEDN and iVN at both the memories 203, 217 of the end device 101 and vehicle 102, respectively, facilitates the mutual first level two way authentication by incorporating nonce comparison on both the end device 101 and vehicle 102. This ensures a more robust authentication mechanism. The first level two authentication may involve: (i) in a first way of authentication of end device 101 by the vehicle 102: receiving “first encrypted message” and “first authentication code” indicative of an “onboard request message” from the end device 101; (ii) in a sub-level of the first way of authentication by the vehicle 102: transmitting “second encrypted message” and “second authentication code” indicative of “on-board request verification message” to verify that the onboard request message from the end device 101 is authentic/valid; (iii) in a second way of authentication of vehicle 102 by the end device 101: receiving a “third encrypted message” and “a third authentication code” indicative of “on-board accept message” from the vehicle 102 (*iv*) in a sub-level of the second way of authentication by the end device 101: transmitting, to the vehicle 102, a “fourth encrypted message” that is “onboard accept verify message” indicative of verification of an on-board accept message. The mutual first level two-way authentication is explained in conjunction with FIGS. 4A, 4B, and 4C.

In a non-limiting embodiment, the memory 203, 209, 217 may be an external memory chip or an inbuilt EEPROM memory, within the end device 101, the zonal controller 103, and the computing unit 105, respectively. In an embodiment, the memory 203, 209, 217 may be a computer-readable medium known in the art including, for example, volatile memory, such as static random-access memory (SRAM) and dynamic random-access memory (DRAM), and/or synchronous dynamic random-access memory (SDRAM) and/or non-volatile memory, such as read only memory (ROM), erasable programmable ROM, flash memories, hard disks, optical disks, and magnetic tapes. In some embodiments, the memory 203, 209, 217 may be communicatively coupled to the corresponding the end device 101, the zonal controller 103 or the computing unit 105 and may be configured to store various data processed by each of the end device 101, the zonal controller 103, or the computing unit 105.

Further, the OBS 215 may trigger the SUC 219 for automatic software component checking and downloading after successful completion of third level authentication of the end device 101 by the OEM cloud 107 through the vehicle owner approval mechanism. In some embodiments, the SUC 219 may be configured to interact with the OEM cloud 107 for downloading the relevant software component related to the end device 101 to the vehicle 102. Further, the SUC 219 may comprise but not limited to components such as Software Update Checker (SUChecker) 221 and an Upgrade Download Client 223. The SUChecker 221 may be configured to receive the end device details and the vehicle details from the OBS 215 and provides the end device details and the vehicle details to the OEM cloud 107. The SUChecker 221 may be configured to receive software availability status message comprising a Uniform Resource Indicator (URI) for downloading the software component from the OEM cloud 107 if the software component is available. Thereafter, the SUChecker 221 may be configured to transmit the URI to the UDC 223. In case no software component is available, the SUChecker 221 may be configured to receive an error message from the OEM cloud 107 and may transmit the error message to the OBS 215 of the computing unit 105.

In some embodiments, the UDC 223 may be configured to receive the URI from the SUChecker 221 and transmit the download request to the OEM cloud 107. Additionally, the UDC 223 also downloads the software components from the UDC 223 and installs the software components on the computing unit 105 or the zonal controller 103.

In an embodiment, the OEM cloud 107 may be a remote entity that takes care of the second level and the third level authentication of the end device 101 through the vehicle 102. The OEM cloud 107 may comprise an OEM Authentication Server (OAS) 225, OEM Software Component Repository (OSCR) 227, and an OEM operation notifier 229. In an embodiment, the OEM cloud 107 may be configured to authenticate the end device 101 with the vehicle 102 in the second level authentication. In another embodiment, the OEM cloud 107 confirms the onboarding of the end device 101 from the vehicle owner through a communication device 109 in the third level authentication. The communication device 109 may be any computing device, without limiting to, a personal computer, a laptop, or a smartphone, which can be configured to perform the method of present disclosure.

In an embodiment, the OAS 225 receives the end device details such as end device SN, part number, manufacturer details and the vehicle details (such as VIN) from the OBS 215 of the vehicle 102. The received details are used to verify whether the end device 101 is authorized or authentic to connect to the vehicle 102. The OAS 225 may comprise, but not limited to, an OAS verifier 231 and an OAS database 233. In the second level authentication, OAS verifier 231 receives the end device details and the vehicle details from the OAC 213 of the vehicle 102. The OAS verifier 231 may be configured to utilize the OAS database 233 for the end device 101 authentication by verifying whether the received end device details are present in the list of registered end devices or authorized by the OEM. Additionally, the OAS verifier 231 also checks whether the end device details match the vehicle details stored in the OAS database 233. Upon finding the match in the OAS database 233, the OAS verifier 231 may be configured to generate and provides an authentication success message or a authentication reject message to the OBS 215 via the OAC 213.

In some embodiments, in the third level authentication, the OAS verifier 231 may be configured to transmit a One-Time Password (OTP)/URL to the communication device 109 using contact details (i.e., mobile number or email address) associated with the vehicle owner. In some embodiment, the contact details may be extracted using the vehicle details from the OAS database 233. Thus, the OAS verifier 231 responds to the OBS 215, based on the received response from the vehicle owner.

In some embodiments, the OAS database 233 may store authentic end device details such as end device serial number (SN), part number, manufacturer details etc., Further, the OAS database 233 may be also store vehicle details such as VIN. Additionally, the OAS database 233 may store contact details such as mobile number, email address, etc., of the vehicle owner mapped against corresponding vehicle details such as VIN etc.

In some embodiments, the OSCR 227 may be used by the OEM to store all the software components or software packages for the computing unit 105 related to the authenticated end devices 101. The OSCR 227 may comprise sub-components (not shown) such as software update server (SUS), Software Package check Module (SPCM), an update download server (UDS), and an artifactory. The SUS may be configured to receive the end device details and the vehicle details from the SUChecker 221 and forwards the end device details and the vehicle details to the SPCM. The SUS may also receive a software availability status message from the SPCM and provides the same to the SUChecker 221. Additionally, the SUS may receive the download request along with URI from the UDC 223 and transmit download request along with URI to the UDS.

In some embodiment, the SPCM may receive the end device details and the vehicle details SUS and check within the Artifactory for the availability of the software packages or software components related to the end device 101. The SPCM may receive the status message from the Artifactory about software availability along with the URI (in case of software availability) forwards the same to the SUS.

In some embodiments, the Artifactory may be a database where the end device details along with related software components or software packages for computing unit 105 may be stored. The Artifactory database comprises a mapping of the end device details and corresponding URI of available software packages. Further, the UDS may receive the download request along with URI from the SUS. The UDS may download the software component based on the received URI and forwards the URI to the UDC 223.

In some embodiments, the OEM operation notifier 229 may be used to update algorithms which may be used to update the EDN value and VN value respectively on both the end device 101 and the vehicle 102.

Figure 3A:
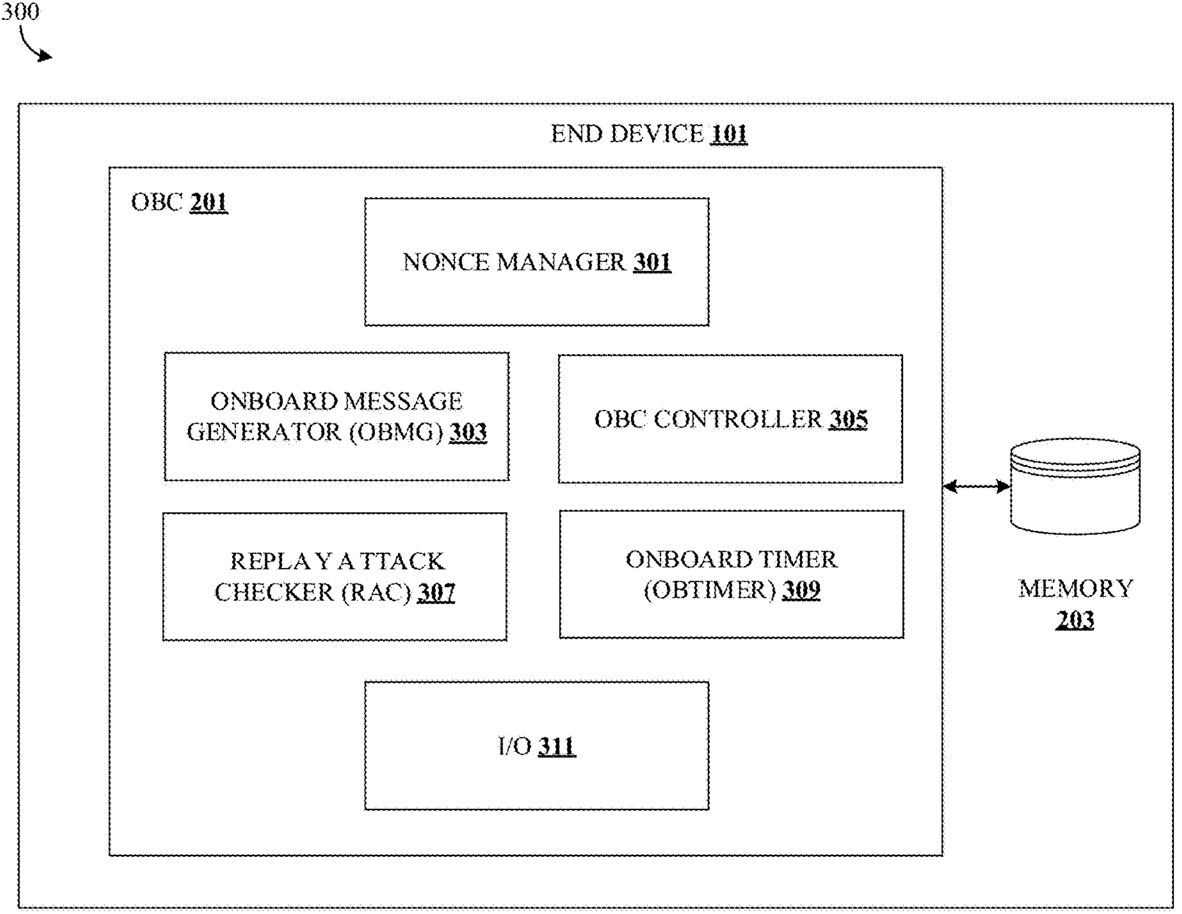
FIG. 3A shows a detailed diagram of an end device, in accordance with an embodiment of the present disclosure.

FIG. 3A shows a detailed diagram of an end device 101, in accordance with an embodiment of the present disclosure. The OBC 201 may be coupled to the memory 203. Further, the OBC 201 may comprise sub-components such as a nonce manager 301, an Onboard message Generator (OBMG) 303, an OBC controller 305, a replay attack checker (RAC) 307, an Onboard Timer (OBTIMER) 309, and an I/O interface 311 such as a security framework interface.

The nonce manager 301 may be configured to initialize the EDN value stored in the memory 203 when the end device 101 may be connected to the vehicle 102 for first time. Similarly, the nonce manager 301 may be configured to initialize the VN value corresponding to the initial vehicle nonce value stored in the memory 203. The nonce manager 301 may provide the EDN value and the VN value to the OBC controller 305.

Further, the OBMG 303 may receive the EDN value and VN value from the nonce manager 301. The OBMG 303 may also retrieve the end device SN and the secret key from the memory 203. Further, OBMG 303 creates a message using the end device (SN) and the EDN value. The OBMG 303 may be configured to generate a first encrypted message using the secret key. The first encrypted message comprises the SN and the EDN value. Used herein, the term “Serial Number (SN)” may uniquely identify the end device 101 and prevent confusion during connection attempts with the vehicle 102. The incorporation of the SN in the first level authentication ensures that the correct end device 101 is connecting to the vehicle 102, when multiple other end devices try to establish connection with the vehicle 102 at the same time. Used herein, the term “first encrypted message” is indicative of an “onboard request message” from the end device 101 to the vehicle 102.

Subsequently, the OBMG 303 may generate a first authentication code using the first encrypted message, the secret key, and a crypto algorithm. The crypt algorithm may be any suitable encryption algorithm such as advanced encryption standard-cipher message (AES_CMAC). Used herein, the term “first authentication code” is associated with the onboard request message.

Thereafter, the OMBG 303 may be configured to transmit the first encrypted message and the first authentication code to the OBC controller 305 of the end device 101. Further, the OBMG 303 may generate a fourth encrypted message comprising the extracted SN and the VN value. The OBMG 303 may generate the fourth encrypted message using the same secret key. Subsequently, the OBMG 303 may generate a fourth authentication code using the fourth encrypted message, the secret key, and the crypto algorithm. Thereafter, the OBMG 303 may transmit the fourth encrypted message and the third authentication code to the OBC controller 305 of the end device 101. Used herein, the term “fourth encrypted message” is “onboard accept verify message” indicative of verification of an on-board accept message from the vehicle 102 by the end device 101.

Further, the OBC controller 305 may be configured to perform the functionality of the end device 101. The OBC controller 305 is a main component of the OBC 201 which may configured to receive and store the iEDN value and VN value from the nonce manager 301. Subsequently, the OBC controller 305 may be configured to receive the crypto algorithms from the memory 203 for updating the EDN and the VN on the memory 203. In some embodiments, the OBC controller 305 may be configured to retrieve the secret key from the memory 203. The OBC controller 305 may be configured to perform secure communication with the computing unit 105 of the vehicle 102 for performing the first level authentication between the end device 101 and the vehicle 102.

The OBC controller 305 may be configured to receive a third encrypted message and a third authentication code from the OBS 215 when the end device 101 is successfully authenticated by the vehicle 102. In other words, the OBC controller 305 may receive the third encrypted message and the third authentication code from the OBS 215 when the end device 101 is successfully authenticated by the vehicle 102, an OEM cloud 107, and the vehicle owner. The OBC controller 305 may be configured to extract the VN value and the SN from the third encrypted message using the secret key. The OBC controller 305 may be configured to generate a reject message indicating an authentication failure of the vehicle 102 if the extracted VN value does not match with the stored VN value. The OBC controller 305 may transmit the reject message to the OBS 215 of the vehicle 102. In an embodiment, the OBC controller 305 may provide the extracted VN value to the RAC 307 of the OBC 201 of the end device 101. Alternatively, the OBC controller 305 may be configured to successfully authenticate the vehicle 102 if the extracted VN value matches with the stored VN value. Subsequently, the OBC controller 305 may receive the fourth authentication code from the OBMG 303 of the OBC 201 and compares the fourth authentication code with the received third authentication code. If the fourth authentication code matches with the third authentication code, the OBC controller 305 may transmit an authentication message to the OBS 215 indicating the successful authentication of the vehicle 102 by the end device 101. However, if the fourth authentication code does not match with the third authentication code, the OBC controller 305 may transmit the reject message to the OBS 215 indicating the authentication failure of the vehicle 102. In Similar manner, the OBC controller 305 may receive reject message or authentication message from the OBS 215 indicating authentication failure or authentication success of the end device 101 by the vehicle 102.

In some embodiments, the OBC controller 305 may be configured to receive the reject message from the OBS 215 in the second level authentication failure from the OEM cloud 107. Also, the OBC controller 305 may receive the final authentication confirmation or reject message from the OBS 215 in the third level authentication success or failure respectively. Lastly, the OBC controller 305 may receive an error message from the OBS 215 in case no software component is available for the vehicle 102.

In some embodiments, the RAC 307 may be configured to receive and store the extracted VN value from the OBC controller 305. Thereafter, the RAC 307 may confirm the VN value by comparing the currently received VN with the previously stores VN value(s). If a mismatch is found between the currently received VN and the previously stored VN, a replay attack is confirmed. The RAC 307 may communicate the replay attack to the OBC controller 305.

As used herein, the term OBC 201, nonce manager 301, OBMG 303, OBC controller 305, a replay attack checker 307, an OBTIMER 309, may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In some embodiments, OBC controller 305 may be configured to perform one or more functions of the vehicle 102 for performing onboarding of the end device 101 by performing multi-level authentication. However, the OBC 201 may comprise additional components which may be required to perform the desired functionality in accordance with the present disclosure.

In some embodiments, the OBTIMER 309 may be referred to as a timer which gets triggered as soon as the first encrypted message and the first authentication code is transmitted by the OBC controller 305 to the OBS 215. The OBTIMER 309 then waits for a specific time for receiving a response (either authentication success message or reject message) from the OBS 215 before it expires. Thus, the OBTIMER 309 helps in preventing stale messages and further enhances security by reducing the opportunity of replay attacks.

In some embodiments, the I/O interface 311 may comprise but not limited to security framework interface. The security framework interface 311 may be configured to provide access to cryptography algorithm and secure connection mechanisms available on the end device 101 to establish a secure connection between the OBC controller 305 of the end device 101 and the OBS 215 of the vehicle 102. In an embodiments, the I/O interface 311 may include a variety of software and hardware interfaces, for example, a web interface, a graphical user interface, an input device, an output device, and the like for interacting with a user of the end device 101.

Figure 3B:
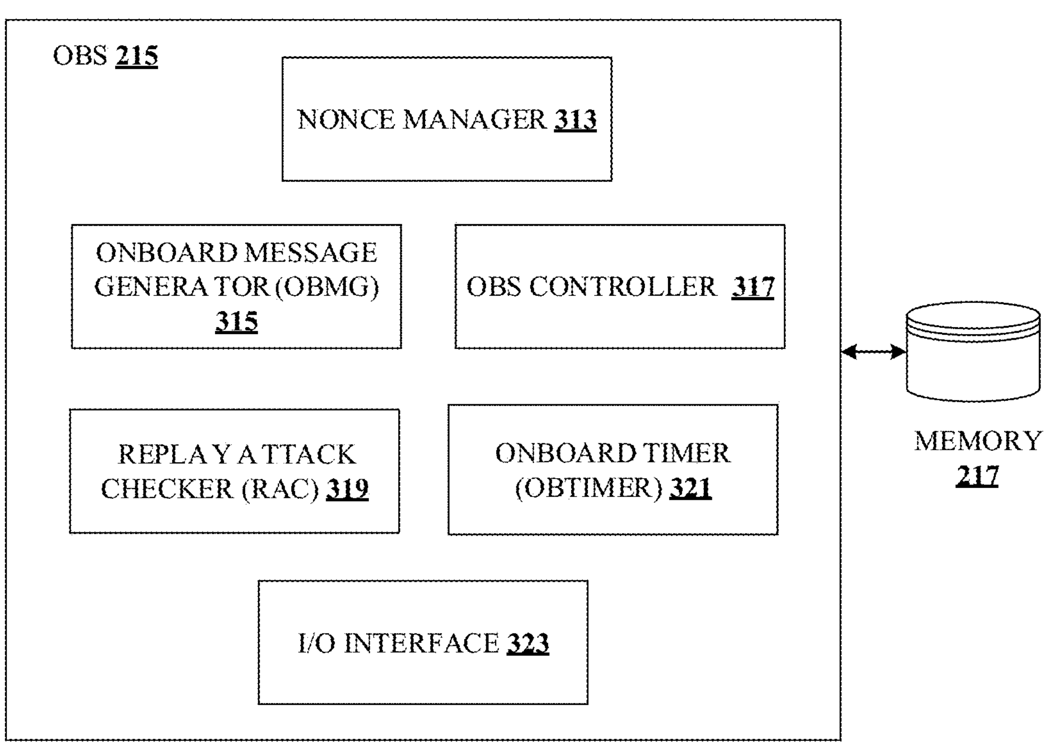
FIG. 3B shows a detailed diagram of an Onboard Server (OBS) of a vehicle, in accordance with an embodiment of the present disclosure.

FIG. 3B shows an exemplary architecture of the Onboard Server (OBS) 215 of the vehicle 102, in accordance with an embodiment of the present disclosure. In an embodiment, the OBS 215 may be coupled to the memory 217. In some embodiments, similar to the OBC 201, the OBS 215 may comprise sub-components such as a Nonce Manager 313, an Onboard message generator 315, replay attack checker 319, onboard timer (OBTIMER) 321, and an I/O interface 323. The nonce manager 313 may initialize the VN value corresponding to the initial vehicle nonce (iVN) value stored in the memory 217 of the computing unit 105 when the first encrypted message is received from the end device 101 which is connected to the vehicle 102 for the first time. Similarly, the nonce manager 313 initializes the EDN corresponding to the iEDN value stores in the memory 217 of the computing unit 105. Further, the nonce manger 313 provides the VN value and the EDN value to the OBMG 315 and the OBS controller 317.

In some embodiments, the OBMG 315 receives the VN value and the EDN value from the nonce manager 313. The OBMG 315 may be configured to retrieve the secret key from the memory 217 of the computing unit 105. Further, the OBMG 315 may receive the end device SN from the OBS 215 which is extracted from the received first encrypted message. OBMG 315 may create a second encrypted message using the SN and the EDN using the secret key. Subsequently, the OBMG 315 generates a second authentication code using the second encrypted message, the secret key, and the crypto algorithm. The OBMG 315 may provide the second encrypted message and the second authentication code to the OBS controller 317 of the computing unit 105. Used herein, the term “second encrypted message” is “on-board request verification message” indicative of verification of the onboard request message by the vehicle 102. Further, the OBMG 315 may generate a third encrypted message and a third authentication code. The third encrypted message comprises the extracted SN of the at least one end device 101 and the VN value of the vehicle 102. The OBMG 315 may transmit the third encrypted message and the third authentication code to the OBC controller 305 for further authentication. Used herein, the term “third encrypted message” is “on-board accept message” indicative of acceptance of the onboard request message by the vehicle 102.

In some embodiments, the OBS controller 317 may be a main sub-component of the OBS 215. The OBS controller 317 may be configured to perform the functionality of the computing unit 105 in some aspect of the present disclosure. The OBS controller 317 may be configured to receive the algorithms from the memory 217 of the computing unit 105 for updating the EDN value and the VN value. The OBS controller 317 may be configured to maintain the updated EDN value and the VN value on the memory 217 of the computing unit 105. Moreover, the OBS controller 317 may be configured to retrieve the secret key from the memory 217 of the computing unit 105. Further, the OBS controller 317 may be configured to perform secure communication with the end device 101 for performing the first level two-way authentication. The OBS controller 317 receives the first encrypted message and first authentication code from the OBC controller 305 when the end device 101 is connected with the vehicle 102. The OBS controller 317 may be configured to extract the EDN value and the SN from the first encrypted message using the secret key. The OBS controller 317 may be configured to generate a reject message indicating the authentication failure to the OBC controller 305 if the extracted EDN value does not match with the stored EDN value. Further, the OBS controller 317 may provide the extracted EDN value to the RAC 319 of the OBS 215 of the computing unit 105. Alternatively, if the extracted EDN value matches with the stored EDN value, the OBS controller 317 may provide authentication success message to the OBC 201 indicating authentication of the end device 101 by the vehicle 102.

In another embodiment, the OBS controller 317 may be configured to receive the fourth authentication code from the OBMG 315 of the OBS 215 and compares the received third authentication code. If the fourth authentication code does not match with the third authentication code, the OBS controller 317 may transmit the reject message indicating authentication failure of the end device 101 by the vehicle 102. Alternatively, if the fourth authentication code matches with the third authentication code, the OBS controller 317 may transmit an authentication success message to the OBC 201 indicating successful authentication of the end device 101 by the vehicle 102.

For performing the second level authentication, the OBS controller 317 may be configured to receive the end device details in the success message and transmit the end device details to the OAS verifier 231 of the OEM authentication server 225 of the OEM cloud 107. In another embodiment, the OBS controller 317 may be configured to receive the end device details along with the first encrypted message and the first authentication code. The OBS controller 317 may be configured to retrieve the vehicles details such VIN from the memory 217 of the computing unit 105. Thereafter, the OBS controller 317 may be configured to transmit the vehicle details along with the end device details through the OAC 213. In some embodiments, the OBS controller 317 may be configured to receive the authentication success message or reject message from the OAS verifier 231 of the OAS 225 of the OEM cloud 107. Accordingly, the OBS controller 317 may transmit the authentication success message or reject message to the OBC controller 305 of the end device 101.

Further, for performing the third level authentication, the OBS controller 317 may be configured to receive a final authentication success message or reject message from the OAS verifier 231. The OBS controller 317 may be configured to transmit the authentication success message or the reject message to the OBC controller 305. Upon receiving the final authentication success message, the OBS controller 317 may transmit the end device details and vehicle details to the SUChecker 221. In another embodiment, the OBS controller 317 may be configured to transmit the end device details the vehicle details to the SUChecker 221 based on the authentication success message from the end device 101. Lastly, the OBS controller 317 may be configured to transmit an error message from the SUChecker 221 if no software component is available for the end device 101 of the vehicle 102.

In some embodiments, the RAC 319 of the computing unit 105 may be configured to receive and store the extracted EDN value from the OBS controller 317. Further, the RAC 319 may be configured to check the freshness of the EDN value by comparing the currently received EDN with the previously stored EDN value. If the currently received EDN value does not match with the previously EDN value, the RAC 319 confirms the replay attack and communicates the replay attack to the OBS controller 317.

In some embodiments, the OBTIMER 321 may be referred to as a timer which gets triggered as soon as the third encrypted message and the third authentication code is transmitted by the OBS controller 317 to the OBC controller 305. The OBTIMER 321 waits for a specific time to receive a response from the OBC controller 305 before the timer expires. Thus, this helps in preventing the processing of stale messages and further enhances security by reducing the opportunity of replay attacks.

In some embodiments, the I/O interface 323 may comprise, but not limited to, a security framework interface which may be configured to provide access to cryptography algorithm and secure connection mechanism available on the computing unit 105 of the vehicle 102 to establish a secure connection between the OBC controller 305 of the end device 101 and the OBS controller 317 of the vehicle 102. In an embodiments, the I/O interface 323 may include a variety of software and hardware interfaces, for example, a web interface, a graphical user interface, an input device, an output device, and the like for interacting with a user of the computing device 105.

FIGS. 4A, 4B and 4C illustrate a sequence diagram for performing a first level two-way authentication for performing onboarding of end device 101 of vehicle 102, for implementing embodiments consistent with the present disclosure. The two-way authentication is termed because the authentication is performed between the at least one end device 101 and the computing unit 105 of the vehicle 102. In other words, in one embodiment, the at least one end device 101 authenticates the vehicle 102. The at least one end device 101 may authenticate the vehicle 102 using OBS 215 of the computing unit 105. In another embodiment, the vehicle 102 authenticates the at least end device 101. In some embodiments, the vehicle 102 may authenticate the at least one end device 101 using the OBC 201 of the at least one end device 101. Thus, the first level two-way authentication ensures that there is no external attack and both the at least one end device 101 and the vehicle 102 are valid. In one embodiment, an initial connection may be established between the at least one end device 101 and the vehicle 102 via a wired medium such as an Automotive Ethernet, Controller Area Network (CAN), Universal Serial Bus (USB), Serial Peripheral Interface (SPI), etc., In an alternative embodiment, the initial connection may be established between the at least one end device 101 and the vehicle 102 via a wireless medium such as Wi-Fi, Bluetooth, etc., In some embodiments, the initial connection may be either a secured connection or a non-secured connection. In some embodiments, the OBC 201 of the at least one end device 101 may communicate with the OBS 215 of the computing for the first level two-way authentication after establishing a secure connection. The secured connection may be established over the above listed wired medium or wireless medium.

Initially, an Original Equipment Manufacturer (OEM) may write an initial EndDeviceNonce (iEDN) value, a secret key, and a corresponding algorithm (Algo-EDN) on the computing unit 105 of the vehicle 102 during the production of the at least one end device 101. Subsequently, the OEM may share the EDN value, the secret key and the corresponding algorithm (Algor-EDN) with the end device manufacturer. In a similar manner, the OEM may write an initial VehicleNonce (iVN) value and a corresponding algorithm (Algo-VN) on the computing unit 105 of the vehicle 102 during the production of ht vehicle 102. Subsequently, the OEM may share the iVN and the Algo_VN with the end device manufacturer. The end device manufacturer may write a globally unique end device serial number (SN) and all of the received values from the OEM to the end device 101. It may be worth noting that the secret key may remain same for both the end device 101 and the vehicle 102.

At step 401, on first time connection of the at least one end device 101 with the vehicle 102, a nonce manager 301 of the OBC 201 of the at least one end device 101 may initialize EDN to the iEDN value and VN value to the initial VN. At step 403, based on the end device 101 connection with the vehicle 102, an OBC controller 305 of the OBS 215 of the computing unit 105 of the vehicle 102 may generate a trigger to the end device 101 to start the authentication process. Further, at step 405, the OBC controller 305 of the OBC 201 may receive the trigger to start the authentication process from the OBS controller 317 on available initial connection. The initial connection may be a non-secure connection since there are no confidential details.

At step 407, the authentication process starts with the OBC controller 305 establishing a secure connection with the OBS controller 317 via the I/O interface 311 such as the security framework interface available on both the at least one end device 101 and the vehicle 102. Thereafter, at step 409, an Onboard Message Generator (OBMG) 303 of the OBC 201 may generate a first encrypted message comprising a serial number of the at least one end device 101. In an embodiment, the first encrypted message may be encrypted using the first secret key. Subsequently, at step 411, the OBMG 303 of the OBC 201 generates a first authentication code corresponding to the first encrypted message using the first secret key. In an embodiment, the first authentication code may generated using a crypto-algorithm such as advanced encryption standard-cipher message authentication code (AES_CMAC). However, any suitable crypto-algorithm may be used for generating the authentication code.

Thereafter, as shown in step 413, the OBC controller 305 may be configured to transmit the first encrypted message and the first authentication code to the OBS controller 317. As soon as the first encrypted message and first authentication code are transmitted, an OBTIMER 309 may be configured to start a timer as shown in step 413*a*. The timer may be used to wait for an authentication success message (also referred to as authentication message or success message) or a reject message (also referred to as authentication failure message) from the OBS controller 317. If the timer is expired before receiving the authentication success message or the reject message, the authentication process is stopped, and the flow continues to step 23. In an alternative embodiment, if the reject message corresponding to step 10*b* and step 13*b* or the authentication success message corresponding to step 17 is received from the OBS controller 317, then the timer is stopped.

Further, upon receiving the first encrypted message and the first authentication code, at step 415, a nonce manager 313 of the OBS 215 initializes VN to the initial VN value and EDN to the initial EDN value written in the memory 217 of the vehicle 102 during the production of the vehicle 102. In some embodiments, two or more instances may be stored in a table form on the memory 217 and may be maintained by the OBS controller 317 when two or more end devices are getting authenticated on the vehicle 102 parallelly. The table will have one row corresponding to the one end device 101 with EDN value, VN value, SN, etc., Thereafter, the OBS controller 317 may decrypt the received first encrypted message using the secret key to extract EDN value and SN. At step 417, the OBS controller 317 may compare the values of the extracted EDN with the initialized END value received from the nonce manager 313 of the OBS. 215 As shown in step 417*a*, if both the values are matched, then the authentication process will continue to next step 419. However, if the values do not match as shown in step 417*b*, the OBS controller 317 may transmit the reject message indicating that the authentication failure of the at least one end device 101. The OBS controller 317 may transmit the reject message to OBC controller 305. Subsequently, a replay attack checker 319 of the OBS 215 compares the extracted EDN value with previously extracted EDN value(s). If there is a match, then the RAC 319 may confirm a replay attack to the OBS controller 317. For such replay attacks, the computing unit 105 may not entertain any further connection requests from the at least end device 101 in future. In an embodiment, the computing unit 105 may share the end device details with the OAS 225 of the OEM cloud 107 to take preventive or prohibitive actions. In case there is no match found between the extracted EDN value with the previously extracted EDN value(s), then no action may be taken by the OBS controller 317, and the authentication may stop, and the process flow continues to step 443.

At step 419, the OBMG 315 of the OBS 215 may generate a second encrypted message and a second authentication code using the extracted SN and the iEDN. The OBMG 315 may generate the second encrypted message using the second secret key. Further, as shown in step 421, the OBMG 315 may generate a second authentication code corresponding to the second encrypted message using the crypto-algorithm such as the advanced encryption standard-cipher message authentication code (AES_CMAC). Furthermore, as shown in step 423, OBS controller 317 may compare the generated second authentication code with the first authentication code. If the second authentication code matches with the first authentication code, the authentication for the at least end device 101 by the vehicle 102 is completed as shown in step 423*a*, and process may continue to next step 14. The OBS controller 317 may transmit an authentication success message to the OBS controller 317 indicating successful authentication of the at least one end device 101. However, if the second authentication code does not match with the first authentication code, the OBS controller 317 may transmit the reject message to the OBC controller 305 as shown in step 423*b* and the authentication process stops, and the process flow continues to step 443.

Next, at step 425, a third encrypted message is generated by the OBMG 315 of the OBS controller 317 using the extracted SN and iVN. The OBMG 315 may generate the third encrypted message using the second secret key. Subsequently, at step 427, the OBMG 315 may generate a third authentication code corresponding to the third encrypted message using the crypto algorithm such as AES_CMAC. As shown in step 429, the OBS controller 317 may transmit the third encrypted message and the third authentication code to the OBC controller 305. An OBTIMER 321 of the OBS 215 may start a timer (such as second timer) once the third encrypted message and the third authentication code are transmitted to the at least one end device 101. The timer may be used to wait for an authentication success message or a reject message from the OBC controller 305. If the timer is expired before receiving the authentication success message or the reject message, then the authentication process may stop and the process flow may continue to step 443. Further, the timer may be stopped when the reject message is received corresponding to step 433*b* or the authentication success message is received by the OBS controller 317.

Upon receiving the third encrypted message and the third authentication code, at step 431, the OBC controller 305 decrypts the third encrypted message and third authentication code using the first secret key to extract the VN value and the SN. Further, at step 433, the OBC controller 305 may compare the values of the extracted VN value with the iVN value received from the nonce manager 301 of the OBC 201. As shown in step 433*a*, if the VN value matches with the iVN value, then the authentication process may continue to next step 435. On the contrary, if the VN value does not match with the iVN value as shown 433*b*, then the OBC controller 305 may transmit the reject message to the OBS controller 317 indicating the authentication failure of the vehicle 102. Subsequently, the RAC 307 of the OBC 201 may compare the extracted VN value with previously extracted VN value(s). If a match is found, then the OBC 201 may not take any further action and the authentication process may stop and process flow may continue to step 443. On the other hand, if a match is found between the extracted VN value and the previously extracted VN value(s), then a replay attack may be confirmed. In case of such replay attacks, the at least one end device 101 may log off and close the connection.

At next step 435, the OBMG 303 of the OBC 201 may generate a fourth encrypted message using the SN and the iVN value using the first secret key. Subsequently, at step 437, the OBMG 303 of the OBC 201 may generate a fourth authentication code corresponding to the fourth encrypted message using the crypto-Algorithm such as the advanced encryption standard-cipher message authentication code. Further, as shown in step 439, the OBC controller 305 may compare the fourth authentication code with the fourth encrypted message. If the fourth authentication code matches with the third authentication code, the authentication for the vehicle 102 is successfully completed and the process may continue to transmit the authentication success message to the OBS controller 317. The OBC controller 305 may transmit the authentication success message comprising the SN, part number, manufacturer details stored within the memory 203 of the at least one end device 101, to the OBS controller 317. However, as shown in step 441, if the fourth authentication code does not match with the third authentication code, then the OBC controller 305 may transmit a reject message to the OBS controller 317. The reject message may indicate authentication failure for the vehicle 102. The authentication process may be stopped, and the process may continue to step 443.

In some embodiments, the EDN value and VN value may be updated on both of the at least one end device 101 and the vehicle 102, using the respective crypto algorithm. The updated EDN and previous values of the EDN and the VN may be stored in the table in the memory 217 (as mentioned in step 8) and maintained by the OBS controller 317. Similarly, the updated and the previous values of the EDN and VN may be stored on the at least one end device 101 and maintained by the OBC controller 305.

Optionally, the two algorithms (Algo-EDN and algo-VN) may be updated in both the at least one end device 101 and a memory of the OEM operation notifier 229 of the OEM cloud 107 based on the requirement. During the second or subsequent connection of the at least one end device 101 with the vehicle 102, both the OBC 201 and the OBS 215 may retain the last updated EDN value, the VN value, and the corresponding algorithms in both of the memory 203 and the memory 217. Also, the EDN value the VN value are persistent which may be retained if the at least one end device 101 and the vehicle 102 are powered-off. In an embodiment, in case of hard reset of the at least one end device 101, the last updated EDN value and algorithm may be retained in the memory 203 and the memory 217. In a non-limiting embodiment, the OBS 215 may maintain the EDN values for each of the multiple end devices 101 in a table form in the memory 217.

Figure 5:
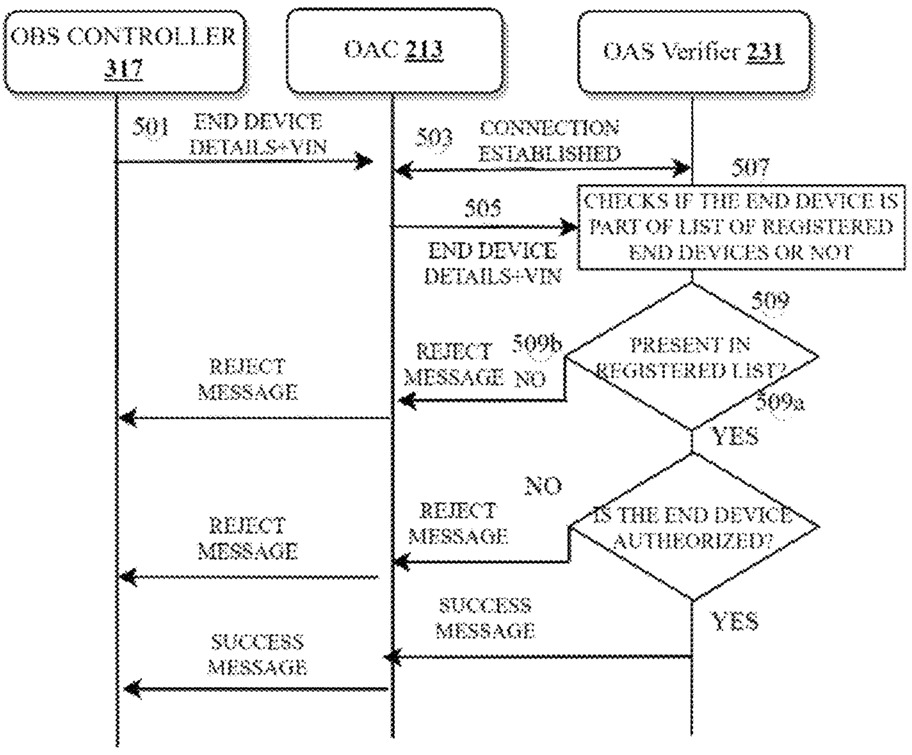
FIG. 5 illustrates a sequence diagram for performing a second level authentication between the vehicle, and the OEM cloud, in accordance with an embodiment of the present disclosure.

FIG. 5 illustrates a sequence diagram for performing a second level authentication between the vehicle 102, and the OEM cloud 107, in accordance with an embodiment of the present disclosure. Once the first-level two way authentication is completed, the second level authentication of the at least one end device 101 may be performed by the vehicle 102 along with the OEM cloud 107. The second level authentication may ensure that the at least one end device 101 is registered with the OEM cloud 107. In other words, the second level authentication may ensure that the at least one end device 101 attempting to connect with the vehicle 102 is not an unregistered end device 101.

To perform the second level authentication, the OBS controller 317 may receive all the end device details in the authentication message. The OBS controller 317 may transmit the received end device details to an OEM Authentication Server (OAS) 225 of the OEM cloud 107 through an OEM Authentication Client (OAC) 213 residing within the computing unit 105 for whether the at least one end device 101 is authenticated by the OEM. If the at least one end device 101 is authenticated by the OEM, the OBS controller 317 may be notified by the OEM cloud 107. The OBS controller 317 may wait for a third level authentication to complete in order to trigger automatic software component download or installation on the computing unit 105 or the zonal controller 103 or both.

In some embodiments, following the first level two-way authentication process, the OBS 215 of the computing unit 105 may trigger the second level authentication as part of multi-level authentication process. In some embodiments, the OBS controller 317 may extract the at least one end device details i.e., SN, part number, manufacturer details, etc., from the received authentication message. As shown at step 501, the OBS controller 317 may transmit the extracted end device details along with the vehicle details such as VIN stored within the computing unit 105 to the OAC 213.

Thereafter, as shown in step 503, the OAC 213 establishes a secure communication channel with the OAS 225 of the OEM cloud 107 facilitates by an External Connectivity Component 211 of the vehicle 102. Further, as shown in step 505, the OAC 213 may transmit the end device details and the vehicle details to an OEM Authentication Server verifier (OAS verifier) 231 of the OAS 225 of the OEM cloud 107 over the secure communication channel. The OAS verifier 231 may receive the end device details and the vehicle details form the OAC 213 of the computing unit 105. Furthermore, as shown in step 507, the OAS verifier 231 may check in an OAS database 233 of the OAS 225 which may store a list of registered end devices and the registered vehicles 102. In other words, the list of registered end devices may be in an OEM database (i.e., the OAS database 233) of the OEM cloud If there is a match of the end device 101 in the OAS database 233, then as shown in step 509, the OAS verifier 231 checks for the received vehicle details in the OAS database 233 to determine if the at least one end device 101 is authorized (i.e., compatible) or not for the vehicle 102 as shown in step 509*a*. If the end device 101 is authorized to get installed on the vehicle 102, the OAS verifier 231 may respond to the OBS Controller 317 through the OAC 213 with an authentication success message and the second level authentication may be completed.

Thereafter, the OBS controller 317 may wait for the third level authentication process to complete. In an alternative embodiment, if the end device 101 may not be authorized to install on the vehicle 102, the OAS verifier 231 may respond to the OBS controller 317 through the OAC 213 with a reject message. The OBS controller 317 may communicate the reject message to the OBC controller 305. The OBC controller 305 may log off and stop the connection between the at least one end device 101 and the vehicle 102. In some embodiments, the OAS verifier 231 may notify the reject message to the vehicle owner using the contact details such as a mobile phone or email address of the vehicle owner via the communication device 109. The contact details may be extracted from the OAS database 233 using the vehicle details such as the VIN.

In case there is no match of the end device details as shown in step 509*b*, the authentication may be stopped, and following steps may be executed. The OAS verifier 231 may respond to the OBS Controller 317 through the OAC 213 with a reject message. The OBS controller 317 may communicate the reject message to the OBC controller 305. Thereafter, the OBC controller 305 may log off and the connection between the at least one end device 101 and the vehicle 102 may be stopped. Optionally, the OAS Verifier 231 may notify the reject message to the vehicle owner using contact details (i.e., mobile phone or email address) of the vehicle owner via the communication device 109. In some embodiments, the contact details may be extracted from the OAS database 233 using the vehicle details such as the VIN.

Figure 6:
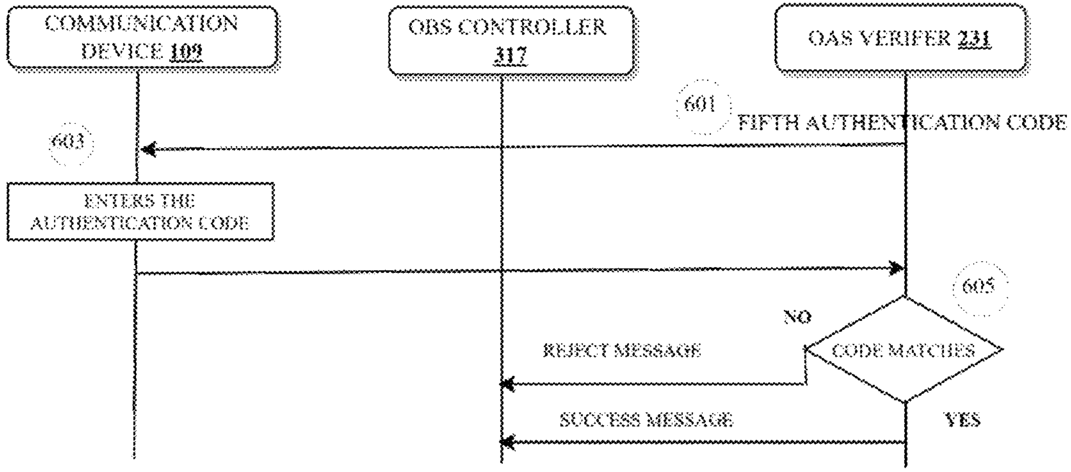
FIG. 6 illustrates a sequence diagram for performing a third level authentication between the vehicle owner and the OEM cloud, in accordance with an embodiment of the present disclosure.

FIG. 6 illustrates a sequence diagram for performing a third level authentication between the vehicle owner via a communication device 109 and the OEM cloud 107, in accordance with an embodiment of the present disclosure. The third level authentication may be performed by the OEM cloud 107 with the vehicle owner in order to make sure that proper installation of the at least one end device 101 on the authenticated or authorized vehicle 102 may be performed.

Following the second level authentication process, the OAS 225 of the OEM cloud 107 proceeds to trigger the third level authentication as part of multi-level authentication process. The third level authentication may be performed by the OAS verifier 231. As shown in step 601, the OAS verifier 231 may transmit a fifth authentication code such as a One-Time Password (OTP) to contact details via the communication device 109 associated with the vehicle owner. The contact details may comprise, but are not limited to, a mobile phone or an email address which may be extracted using the vehicle details (VIN) in the OAS database 233.

In an alternative embodiment, the OAS verifier 231 may share a URL (preferably of the OEM cloud 107) to the communication device 109 of the vehicle owner, to receive the vehicle owner response. Further, as shown in step 603, the vehicle owner may enter the received fifth authentication code in the communication device 109 in OEM specific mobile application or OEM web-portal which may be connected to the OEM cloud 107.

In the alternative embodiment, the vehicle owner may click on the received URL to share the acceptance. Thereafter, as shown in step 605, the OAS verifier 231 may check for the vehicle owner response from the received OTP or accepted URL. If the received OTP or the accepted URL matches with the transmitted fifth authentication code, then the authentication may be completed. The OAS verifier 231 may respond to the OBS controller 317 through the OAC 213 with an authentication success message. Subsequently, the OBS controller 317 may transmit the authentication success message to the OBC controller 305. However, if the received OTP does not match with the fifth authentication code or the URL is not accepted by the vehicle owner, then the OAS verifier 231 may notify the OBS controller 317 through the OAC 213 with a reject message.

In another embodiment, the OAS verifier 231 may re-attempt performing the transmission of the fifth authentication code, before transmitting or notifying the reject message to the OBS controller 317. Upon receiving the reject message, the OBS controller 317 may transmit the reject message to the OBC controller 305 and close the connection with the OBC controller 305.

Post completion of successful multi-level authentication, the OBS controller 317 may check with the OEM cloud for available software components or packages for the computing unit or the zonal controller or both, related to the at least one end device. Based on positive response from the OEM cloud, the software components may be installed on the computing unit or the zonal controller or both. In an embodiment, during the automatic download of software components, any existing method of authentication of software components and the configuration details (using configuration filed) of those components may be used (like MD5 checksum of the software components or token-based generation and validation).

In some embodiments, once the OBS controller 317 may receive the authentication success message from the OAS verifier, the OBS controller 317 may send a request message along with the end device details and the vehicle details to SUChecker of SUC configured within the computing unit of the vehicle. Further, the SUChecker may transmit the end device details and the vehicle details (on any available connection or newly created connection) with SUS of OSCR of the OEM cloud. Thereafter, the SUS may transmit the received end device details and the vehicle details to determine within Artifactory of the OSCR for availability of software components related to the end device. The Artifactory responds to the SPCM with a status message including the status of availability of the software components. In case of availability of the software components, the status message may also include a Uniform Resource Indicator (URI) for downloading or installing the software component.

Further, the SPCM may transmit the received status message with the SUS and the SUS may respond to the SUChecker with the status message. Thereafter, the SUChecker may determine if the software component is available based on the received status message. Upon determining that the software component is available, then the SUChecker may extract the URI from the received status message. Alternatively, upon determining that the software component is not available, the SUChecker may transmit an error message to the OBS controller. 317 The OBS controller 317 may forward the error message to the OBS controller 317 and the connection of the at least one end device with the vehicle may be stopped or disconnected.

In some embodiments, for software update installation, the SUChecker may transmit the extracted URI to UDC of the SUC. The UDC may transmit a download request along with URI to the SUS. Thereafter, the SUS may trigger Update Download Server (UDS) by passing the received download request along with the URI. The UDS uses the URI to download the software component and forwards the URI to the UDC. Finally, the UDC may install the downloaded software components on the computing unit of the vehicle. In an alternative embodiment, the UDC of the SUC may install downloaded software packages on the zonal controller of the vehicle or on both the computing unit as well as the zonal controller, using a standard method available for software installation. In another embodiment, if the SUChecker may not be used in the SUC, then the above mentioned SUChecker steps may be executed by the UDC of the SUC.

Figure 7:
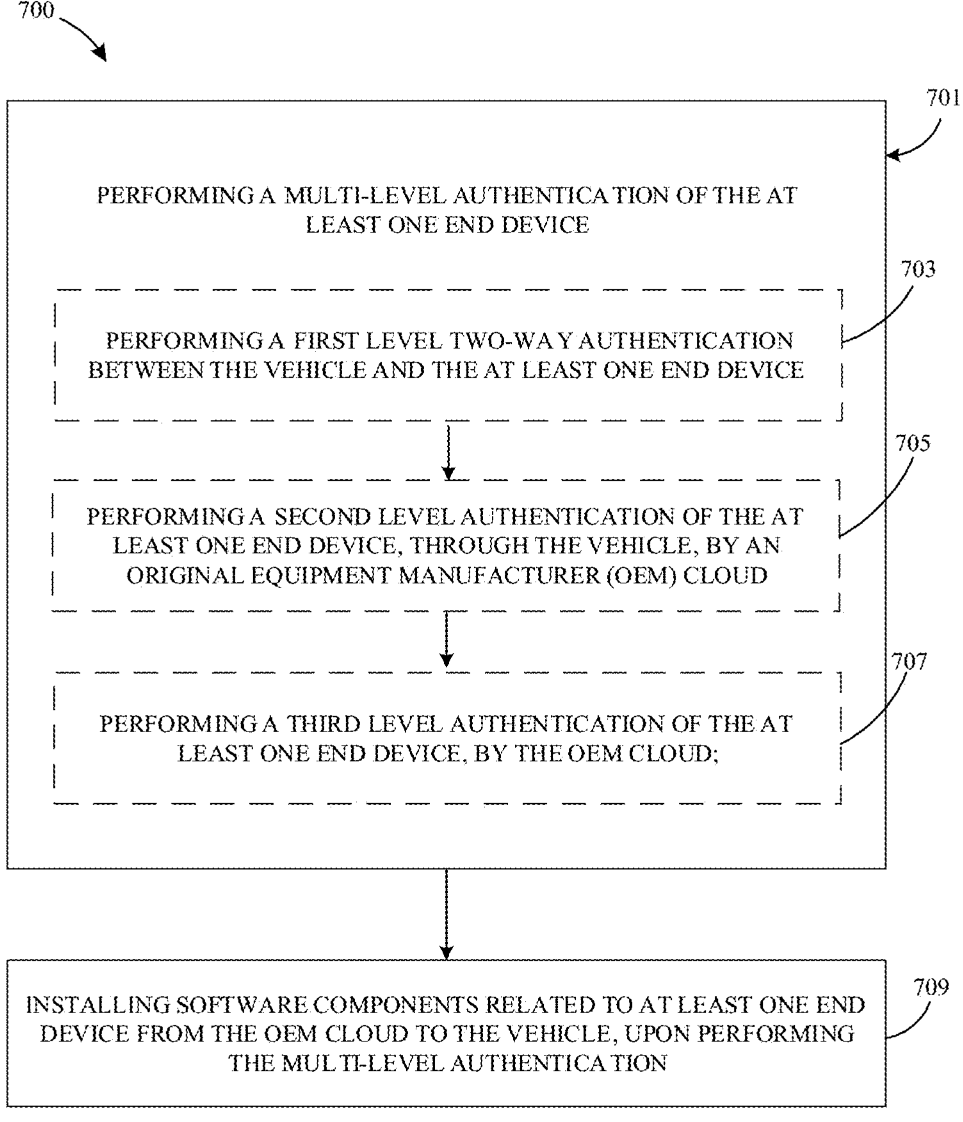
FIG. 7 illustrates a flowchart depicting a method of performing onboarding of an end device of vehicle, in accordance with an embodiment of the present disclosure.

FIG. 7 depicts a method 700 of performing onboarding of at least one end device 101 of a vehicle 102, in accordance with an embodiment of the present disclosure. The method 700 may be described in the general context of computer executable instructions. Generally, computer executable instructions may include routines, programs, objects, components, data structures, procedures, modules, and functions, which perform specific functions or implement specific abstract data types.

The order in which the method 700 is described is not intended to be construed as a limitation, and any number of the described method blocks may be combined in any order to implement the method. Additionally, individual blocks may be deleted from the methods without departing from the spirit and scope of the subject matter described. Further, it may be noted that the method 700 may be performed by end device 101, a computing unit 105, an OEM cloud 107 or communication device 109 sub-components of the end device 101, the computing unit 105, the OEM cloud 107, as shown in FIGS. 2-4. The description of FIG. 7 is provided with reference to FIGS. 2-4.

At block 701, the method 700 comprises performing a multi-level authentication of the at least one end device 101. The method 700 at block 701 may be performed by the end device 101 or the computing unit 105. In some embodiments, the method 700 at block 701 may be performed either by OBC controller 305 or the OBS controller 317. The method 700 may perform the multi-level authentication by performing a first level two-way authentication between the vehicle 102 and the at least one end device 101 as indicated in step 703. The method 700 at step 703 may be performed either by OBC controller 305 or the OBS controller 317.

In some embodiments, the first level two-way authentication between the vehicle 102 and the at least one end device 101 may be performed based on nonce values. The nonce values may be configurable and mutually agreed between the end device 101 and the vehicle 102. In some embodiments, the nonce values may be configured by the OEM during the production of the vehicle 102 and the at least end device 101. In some embodiments, the method may perform first level two-way authentication by exchanging encrypted messages between the at least one end device 101 and the vehicle 102. In some embodiments, the encrypted messages may comprise EndDeviceNonce (EDN) value and VehicleNonce (VN) value that are stored in both the at least one end device 101 and the vehicle 102.

In some embodiments, for performing the first level-two way authentication of the at least one end device 101, the method may comprise performing a first way of authenticating the at least one end device 101 by the computing unit 105 of the vehicle 102 and performing a second way of authenticating the vehicle 102 by the at least one end device 101. The first way of authenticating the at least one end device 101 by the computing unit 105 may comprise receiving a receiving a first encrypted message and a first authentication code corresponding to the encrypted message from the at least one end device 101. The first encrypted message may be encrypted by at the at least one end device 101 using a first secret key stored in the at least one end device 101. Further, the method may extract the SN and the EDN value of the at least one end device 101 by decrypting the received first encrypted message using a second secret key stored in the computing unit 105 of the vehicle 102. The first secret key and the second secret key may be same key.

Further, the method comprises determining whether the extracted EDN value matches with a EDN value stored in the computing unit 105. If the extracted EDN value does not match with the EDN value stored in the computing unit 105, the method may comprise transmitting a reject message to the at least one end device 101 indicating authentication failure of the at least one end device 101 by the vehicle 102. However, if the extracted EDN value matches with the EDN value stored in the computing unit 105, the method may comprise performing a sub-level authentication using the extracted EDN value and the EDN value stored in the computing unit 105.

Further, for performing the sub-level authentication, the method may comprise generating a second encrypted message and a second authentication code corresponding to the second encrypted message. The second encrypted message may comprise the extracted SN and the EDN value stored in the computing unit 105 of the vehicle 102. Thereafter, the method may comprise determining whether the second authentication code matches with the received first authentication code. Further, the method may comprise authenticating the at least one end device 101 if the second authentication code matches with the first authentication code. Finally, the method may comprise transmitting the reject message indicating the authentication failure of the at least one end device 101 if the second authentication code does not match with the received first authentication code.

After successful authentication of the at least one end device 101 by the vehicle 102, the at least end device 101 perform vehicle authentication by performing the second way of authentication. For performing the second way of authenticating the vehicle 102, the method may comprise receiving a third encrypted message and a third authentication code. The third encrypted message may comprise the extracted SN of the at least one end device 101 and the VN value of the vehicle 102. The method may further comprise determining whether the extracted VN value matches with a VN value stored in the at least one end device 101. If the extracted VN value does not match with the VN value stored in the at least one end device 101, the method may comprise transmitting a reject message indicating authentication failure of the vehicle 102. Alternatively, If the extracted VN value matches with the VN value stored in the at least one end device 101, the method may comprise performing a sub-level authentication with the extracted VN value and the VN value stored in the at least end device 101.

For performing the sub-level authentication by the at least one end device, the method comprises generating a fourth encrypted message and a fourth authentication code corresponding to the fourth encrypted message. The fourth encrypted message may comprise the extracted SN and the VN value stored in the at least one end device 101. Thereafter, the method may comprise determining whether the fourth authentication code matches with the third authentication code. Upon determining that the fourth authentication does not match with the third authentication code, the method may comprise transmitting the reject message indicating the authentication failure of the vehicle 102. Whereas, upon determining that the fourth authentication matches with the third authentication code, the method may comprise authenticating the vehicle 102 by the at least one end device 101.

After, post successful first level two-way authentication between the at least one end device 101 and the vehicle 102, the method may comprise updating the EDN value and the VN value based on configurable technique. Subsequently, the method may initiate another first level two-way authentication between the at least one end device 101 and the vehicle 102, based on the updated EDN value and the updated VN value. The method may be performed for reconnecting the vehicle 102 in case the at least one end device 101 is disconnected with the vehicle 102.

Thereafter, for performing the multi-level authentication, the method 700 comprises performing a second level authentication of the at least one end device 101, through the vehicle 102, by the OEM cloud 107 as mentioned in step 705. In some embodiments, the method 700 at step 705 may be performed by the OEM authentication server (OAS) 225. In some embodiments, for performing the second level authentication, the method may comprise receiving the SN of the at least one end device 101 and the vehicle identification number (VIN) from the vehicle 102. Further, the method may comprise determining validity of the SN for the VIN by comparing the received SN and the received VIN with a SN and a VIN stored in the OEM cloud 107. If the SN is valid for the VIN, the method may comprise authenticating the at least one end device 101 for onboarding the at least one end device 101 in the vehicle 102. Alternatively, the method may comprise transmitting the reject message for rejecting the onboarding of the at least one end device 101 if the SN is found invalid for the VIN.

Further, for the performing the multi-level authentication, the method 700 may comprise performing a third level authentication of the at least one end device 101 see block 707. The method at block 707 may be performed by the OAS 225. It may be appreciated to a person skilled in the art that the order of performing the method steps 703, 705, 707 may vary as per the requirements for performing the present disclosure. For performing the third level authentication, the method may comprise transmitting a fifth authentication code to a communication device 109 of the vehicle owner. Further, the method may comprise receiving a response code from the communication device 109 of the vehicle owner. If the response code matches with the fifth authentication code, the method verifies the at least one end device 101 for onboarding in the vehicle 102.

Finally, at block 709, the method 700 may comprise installing software components related to the at least one end device 101 from the OEM cloud 107 to the vehicle 102, upon performing the multi-level authentication. The method 700 at block 709 may be performed based on determining the availability of the software components in the OEM cloud 107 post performing successful authentication of the at least one end device 101. If the software component is available on the OEM cloud 107, the software component is installed in the vehicle 102 and the at least one end device 101 is onboarded to the vehicle 102. In some embodiments, for installing the software components related to the at least end device 101, the method may comprise receiving a request from the vehicle 102 for determining whether the software component related to the at least one end device 101 is available. Thereafter, the method may comprise transmitting a status message comprising a uniform resource indicator (URI) for installing the software components related to the at least one end device 101 to the vehicle 102. However, if the software component is unavailable, the method may comprise transmitting an error message to the at least one end device 101 via the vehicle 102.

Figure 8:
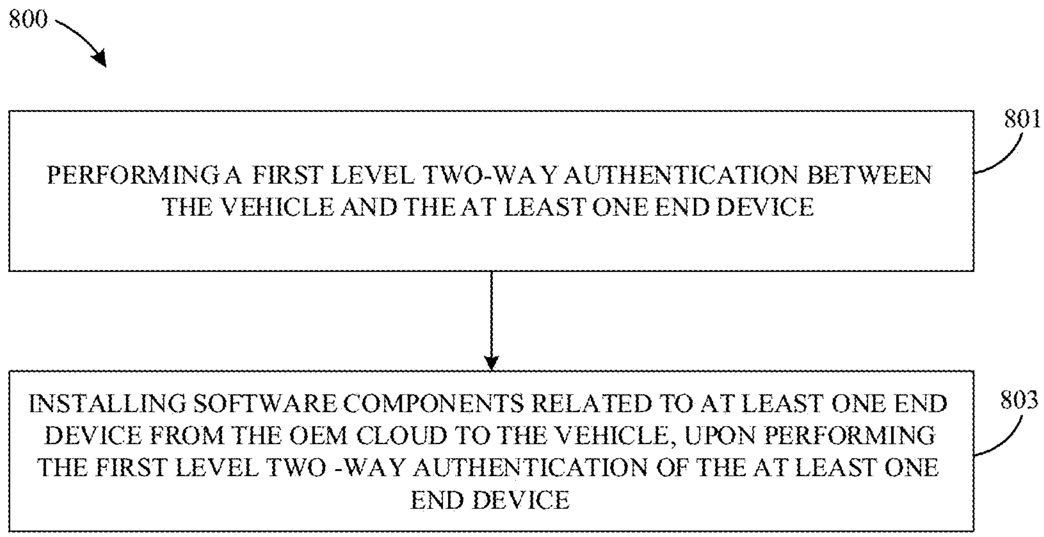
FIG. 8 illustrates a flowchart depicting a method of performing a first level two-way authentication between an end device and a vehicle, in accordance with an embodiment of the present disclosure.

FIG. 8 depicts a method 800 of performing onboarding of at least one end device 101 of a vehicle 102, in accordance with an embodiment of the present disclosure. The method 800 may be described in the general context of computer executable instructions. Generally, computer executable instructions may include routines, programs, objects, components, data structures, procedures, modules, and functions, which perform specific functions or implement specific abstract data types.

The order in which the method 800 is described is not intended to be construed as a limitation, and any number of the described method blocks may be combined in any order to implement the method. Additionally, individual blocks may be deleted from the methods without departing from the spirit and scope of the subject matter described. Further, it may be noted that the method 800 may be performed by end device 101, a computing unit 105, an OEM cloud 107 or communication device 109 sub-components of the end device 101, the computing unit 105, the OEM cloud 107, as shown in FIGS. 2-4. The description of FIG. 8 is provided with reference to FIGS. 2-4.

At block 801, the method 800 comprises performing a first level two way authentication between the vehicle 102 and the at least one end device 101. The method 800 at step 801 may be performed either by OBC controller 305 or the OBS controller 317.

In some embodiments, the first level two-way authentication between the vehicle 102 and the at least one end device 101 may be performed based on nonce values. The nonce values may be configurable and mutually agreed between the end device 101 and the vehicle 102. In some embodiments, the nonce values may be configured by the OEM during the production of the vehicle 102 and the at least end device 101. In some embodiments, the method may perform first level two-way authentication by exchanging encrypted messages between the at least one end device 101 and the vehicle 102. In some embodiments, the encrypted messages may comprise EndDeviceNonce (EDN) value and VehicleNonce (VN) value that are stored in both the at least one end device 101 and the vehicle 102.

In some embodiments, for performing the first level-two way authentication of the at least one end device 101, the method may comprise performing a first way of authenticating the at least one end device 101 by the computing unit 105 of the vehicle 102 and performing a second way of authenticating the vehicle 102 by the at least one end device 101. The first way of authenticating the at least one end device 101 by the computing unit 105 may comprise receiving a receiving a first encrypted message and a first authentication code corresponding to the encrypted message from the at least one end device 101. The first encrypted message may be encrypted by at the at least one end device 101 using a first secret key stored in the at least one end device 101. Further, the method may extract the SN and the EDN value of the at least one end device 101 by decrypting the received first encrypted message using a second secret key stored in the computing unit 105 of the vehicle 102. The first secret key and the second secret key may be same key. Further, the method comprises determining whether the extracted EDN value matches with a EDN value stored in the computing unit 105. If the extracted EDN value does not match with the EDN value stored in the computing unit 105, the method may comprise transmitting a reject message to the at least one end device 101 indicating authentication failure of the at least one end device 101 by the vehicle 102. However, if the extracted EDN value matches with the EDN value stored in the computing unit 105, the method may comprise performing a sub-level authentication using the extracted EDN value and the EDN value stored in the computing unit 105.

Further, for performing the sub-level authentication, the method may comprise generating a second encrypted message and a second authentication code corresponding to the second encrypted message. The second encrypted message may comprise the extracted SN and the EDN value stored in the computing unit 105 of the vehicle 102. Thereafter, the method may comprise determining whether the second authentication code matches with the received first authentication code. Further, the method may comprise authenticating the at least one end device 101 if the second authentication code matches with the first authentication code. Finally, the method may comprise transmitting the reject message indicating the authentication failure of the at least one end device 101 if the second authentication code does not match with the received first authentication code.

After successful authentication of the at least one end device 101 by the vehicle 102, the at least end device 101 perform vehicle authentication by performing the second way of authentication. For performing the second way of authenticating the vehicle 102, the method may comprise receiving a third encrypted message and a third authentication code. The third encrypted message may comprise the extracted SN of the at least one end device 101 and the VN value of the vehicle 102. The method may further comprise determining whether the extracted VN value matches with a VN value stored in the at least one end device 101. If the extracted VN value does not match with the VN value stored in the at least one end device 101, the method may comprise transmitting a reject message indicating authentication failure of the vehicle 102. Alternatively, If the extracted VN value matches with the VN value stored in the at least one end device 101, the method may comprise performing a sub-level authentication with the extracted VN value and the VN value stored in the at least end device 101.

For performing the sub-level authentication by the at least one end device 101, the method comprises generating a fourth encrypted message and a fourth authentication code corresponding to the fourth encrypted message. The fourth encrypted message may comprise the extracted SN and the VN value stored in the at least one end device 101. Thereafter, the method may comprise determining whether the fourth authentication code matches with the third authentication code. Upon determining that the fourth authentication does not match with the third authentication code, the method may comprise transmitting the reject message indicating the authentication failure of the vehicle 102. Whereas, upon determining that the fourth authentication matches with the third authentication code, the method may comprise authenticating the vehicle 102 by the at least one end device 101.

Post successful first level two way authentication between the at least one end device 101 and the vehicle 102, the method may comprise updating the EDN value and the VN value based on configurable technique. Subsequently, the method may initiate another first level two-way authentication between the at least one end device 101 and the vehicle 102 based on the updated EDN value and the updated VN value. The method may be performed for reconnecting the vehicle 102 in case the at least one end device 101 is disconnected with the vehicle 102.

Finally, at block 803, the method 800 may comprise installing software components related to the at least one end device 101 from the OEM cloud 107 to the vehicle 102, upon performing the first level two-way authentication. The method 800 at block 803 may be performed based on determining the availability of the software components in the OEM cloud 107 post performing successful authentication of the at least one end device 101 and the vehicle 102. If the software component is available on the OEM cloud 107, the software component is installed in the vehicle 102 and the at least one end device 101 is onboarded to the vehicle 102.

In some embodiments, for installing the software components related to the at least end device 101, the method may comprise receiving a request from the vehicle 102 for determining whether the software component related to the at least one end device 101 is available. Thereafter, the method may comprise transmitting a status message comprising a uniform resource indicator (URI) for installing the software components related to the at least one end device 101 to the vehicle 102. However, if the software component is unavailable, the method may comprise transmitting an error message to the at least one end device 101 via the vehicle 102.

In another embodiment, the at least one end device 101 may be authenticated through multiple levels however the authentication of the at least one end device 101 and the vehicle 102 may be performed differently. First, the at least one end device 101 may be fully authenticated with the vehicle 102 through multiple levels and then only vehicle authentication to the at least one end device 101 may be performed. There may be various benefit of this embodiment such that the new end device will not get access to the vehicle 102 till authenticity of the at least one end device 101 may be fully confirmed, thus this embodiment provides additional security while connecting the new end device to the vehicle 102. After successful completion of all the authentication levels, software component availability corresponding to the new end device 101 may be checked and installed on the vehicle 102.

In some embodiments, the multi-level authentication of the at least one end device may be performed by performing a first way of authenticating the at least one end device by the vehicle described at least in paragraphs [0102]-[0104]. Further, the multi-level authentication may be performed by performing the second level authentication of the at least one end device between the computing unit of the vehicle and the OEM cloud described at least in paragraphs [0086]-[0091]. Thereafter, the multi-level authentication of the at least one end device may be performed by performing the third level authentication of the at least one end device by the OEM cloud and the vehicle owner described at least in paragraphs [0089]-[0093]. Furthermore, the multi-level authentication may be performed by performing the second way of authenticating the vehicle by the at least one end device as described at least in paragraphs [00104]-[0105]. A detailed explanation of performing the multi-level authentication is omitted for the sake of brevity. Finally, upon performing the multi-level authentication of the at least one end device, the software components related to the at least one end device may be installed on the vehicle and the at least one end device may be onboarded to the vehicle after successful software installation. Moreover, a person skilled in the art may appreciate that any permutation and combinations of the features may be performed for performing the multi-level authentication of the at least one end device within the scope of the disclosure, and the description should not be taken into limiting account. In some embodiments, the onboarding process of the at least one end device may be performed by performing at least one of: the first level two-way authentication, the second level authentication, and the third level authentication of the at least one end device. In other embodiments, the mechanisms depicted as three separate levels (first level two-way authentication, the second level authentication, and the third level authentication) can be consolidated/combined into a single level.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Reference Numerals:

| Reference Numeral | Description |
|---|---|
| 100 | Exemplary architecture |
| 101 | End devices |
| 102 | Vehicle |
| 103 | Zonal Controller |
| 105 | Computing unit |
| 107 | OEM cloud |
| 109 | Communication device |
| 201 | On-board client (OBC) |
| 203 | Memory |
| 205, 215 | Onboard server (OBS) |
| 207, 213 | OEM Authentication client (OAC) |
| 209 | Memory |
| 211 | External connectivity component |
| 217 | Memory |
| 219 | Software update client (SUC) |
| 221 | Software Update Checker (SUChecker) |
| 223 | Upgrade Download Client (UDC) |
| 225 | OEM Authentication Server (OAS) |
| 227 | OEM software component repository (OSCR) |
| 229 | OEM Operation notifier |
| 231 | OAS verifier |
| 233 | OAS database |
| 301, 313 | Nonce manager |
| 303, 315 | Onboard message generator (OBMG) |
| 305 | OBC controller |
| 307, 319 | Replay Attack Checker |
| 309, 321 | Onboard Timer (OBTIMER) |
| 311, 323 | I/O interface |
| 317 | OBS controller |

What is claimed is:

1. A method of performing onboarding of at least one end device of a vehicle, the method comprising:

performing a multi-level authentication of the at least one end device, by:

performing a first level two-way authentication between the vehicle and the at least one end device, comprises:

exchanging encrypted messages between the at least one end device and the vehicle, wherein the encrypted messages comprise: an EndDeviceNonce (EDN) value and a vehicle nonce (VN) value that are stored in both the at least one end device and the vehicle;

performing a second level authentication of the at least one end device, through the vehicle, by an Original Equipment Manufacturer (OEM) cloud, comprises:

communicating: (i) a serial number (SN) of the at least one end device from the vehicle to the OEM cloud; (ii) a vehicle identification number (VIN) of the vehicle to the OEM cloud; and determining by the OEM cloud if the SN is valid for the VIN; and performing a third level authentication of the at least one end device, through a communication device of a vehicle owner, by the OEM cloud; and upon performing the multi-level authentication of the at least one end device, installing software components related to at least one end device from the OEM cloud to the vehicle based on determining availability of the software components in the OEM cloud for onboarding the at least end device in the vehicle.

2. The method of claim 1, wherein the first level two-way authentication between the vehicle and the at least one end device is performed based on nonce values.

3. The method of claim 2, wherein the nonce values are configurable and mutually agreed between the at least one end device and the vehicle.

4. The method of claim 1, wherein the second level authentication of the at least one end device is performed by the OEM Cloud using a mechanism of checking for registered end devices in an OEM database of the OEM cloud.

5. The method of claim 1, wherein the third level authentication of the at least one end device is performed, through the communication device of a vehicle owner, by the OEM Cloud using a vehicle owner approval mechanism.

6. The method of claim 1, wherein performing the first level two-way authentication of the at least one end device, comprises:

a first way of authenticating the at least one end device by a computing unit of the vehicle, wherein the computing unit is coupled to each of the at least one end device; and a second way of authenticating the vehicle by at least one end device.

7. The method of claim 6, wherein performing the first way of authenticating the at least one end device by the computing unit of the vehicle comprises:

receiving a first encrypted message and a first authentication code corresponding to the encrypted message from the at least one end device, wherein the first encrypted message comprises the SN and the EDN value of the at least one end device, and wherein the first encrypted message is encrypted by at the at least one end device using a first secret key stored in the at least one end device;

extracting the SN and the EDN value of the at least one end device by decrypting the received first encrypted message using a second secret key stored in the computing unit of the vehicle, wherein the first secret key and the second secret key are same key;

determining whether the extracted EDN value matches with a EDN value stored in the computing unit of the vehicle;

transmitting a reject message to the at least one end device indicating authentication failure of the at least one end device if the extracted EDN value does not match with the EDN value stored in the computing unit of the vehicle; and performing a sub-level of authentication, with the extracted EDN and the EDN value stored in the computing unit.

8. The method of claim 7, wherein performing the sub-level of authentication by the computing unit of the vehicle comprises:

generating, using the second secret key, a second encrypted message and a second authentication code corresponding to the second encrypted message, wherein the second encrypted message comprises the extracted SN and the EDN value stored in the computing unit of the vehicle;

determining whether the second authentication code matches with the received first authentication code;

transmitting an authentication success message indicating successful authentication of the at least one end device if the second authentication code matches with the first authentication code; or transmitting the reject message indicating authentication failure of the at least one end device if the second authentication code does not match with the received first authentication code.

9. The method of claim 6, wherein the second way of authenticating the vehicle by at least one end device comprises:

receiving a third encrypted message and a third authentication code, wherein the third encrypted message comprising the extracted SN of the at least one end device and the VN value of the vehicle, and wherein the third encrypted message is encrypted by the computing unit using the second secret key stored in the vehicle;

extracting the SN and the VN value by decrypting the received third encrypted using the first secret key;

determining whether the extracted VN matches with a VN value stored in the at least one end device;

transmitting a reject message indicating authentication failure of the vehicle if the extracted VN value does not match with the VN value stored in the at least one end device; and performing a sub-level authentication if the extracted VN value matches with the VN value stored in the at least one end device.

10. The method of claim 9, wherein performing the sub-level authentication by the at least one end device comprises:

generating a fourth encrypted message and a fourth authentication code corresponding to the fourth encrypted message, wherein the fourth encrypted message comprises the extracted SN and the VN value stored in the at least one end device;

determining whether the fourth authentication code matches with the third authentication code;

transmitting an authentication success message indicating successful authentication of the vehicle if the fourth authentication code matches with the third authentication code; or transmitting the reject message indicating authentication failure of the vehicle if the fourth authentication code does not match with the third authentication code.

11. The method of claim 1, further comprising:

updating the EDN value and the VN value based on a configurable technique, after performing the first level two-way authentication; and initiating a subsequent first level two-way authentication between the at least one end device and the vehicle based on the updated EDN value and the updated VN value for reconnecting with the vehicle, if the at least one end device is disconnected with the vehicle.

12. The method of claim 1, wherein performing the second level authentication of the at least one end device, through the vehicle, by the OEM cloud, comprises:

receiving the SN of the at least one end device and the VIN from the vehicle; determining validity of the SN for the VIN by comparing the received SN and the received VIN with a SN and a VIN stored in the OEM cloud;

authenticating the at least one end device for onboarding the at least one end device in the vehicle if the SN is valid for the VIN; and transmitting an authentication failure message to the vehicle for rejecting the onboarding of the at least one end device in the vehicle if the SN of the at least one end device is not valid for the VIN.

13. The method of claim 1, wherein performing the third level authentication of the at least one end device, through the communication device of the vehicle owner, by the OEM cloud, comprises:

transmitting a fifth authentication code to the communication device of the vehicle owner;

receiving a response code from the communication device of the vehicle owner; and verifying the at least one end device for onboarding in the vehicle when the response code matches with the fifth authentication code.

14. The method of claim 1, wherein installing the software components related to at least one end device from the OEM cloud to the vehicle, comprises:

receiving, by the OEM cloud, a request from the vehicle for determining whether the software components related to the at least one end device are available, after performing the successful multilevel authentication of the at least one end device;

transmitting, by the OEM cloud, a status message comprising a uniform resource indicator (URI) for installing the software components related to the at least one end device to the vehicle, if the software components download is available; and transmitting, by the OEM cloud, an error message to the at least one end device via the vehicle if the software components related to the at least one end device is not available.

15. A method of performing onboarding of at least one end device of a vehicle, the method comprising:

performing a first level two-way authentication between the vehicle and the at least one end device; and upon performing the first level two-way authentication, installing software components related to at least one end device from the OEM cloud to the vehicle based on determining availability of the software components in the OEM cloud for onboarding the at least end device in the vehicle, wherein the first level two-way authentication between the vehicle and the at least one end device is performed based on nonce values, and wherein the nonce values are configurable and mutually agreed between the at least one end device and the vehicle, wherein performing the first way of authenticating the at least one end device by the computing unit of the vehicle comprises:

receiving a first encrypted message and a first authentication code corresponding to the encrypted message from the at least one end device, wherein the first encrypted message comprises the SN and the EDN value of the at least one end device, and wherein the first encrypted message is encrypted by at the at least one end device using a first secret key stored in the at least one end device;

extracting the SN and the EDN value of the at least one end device by decrypting the received first encrypted message using a second secret key stored in the computing unit of the vehicle, wherein the first secret key and the second secret key are same key;

determining whether the extracted EDN value matches with a EDN value stored in the computing unit of the vehicle;

transmitting a reject message to the at least one end device indicating authentication failure of the at least one end device if the extracted EDN value does not match with the EDN value stored in the computing unit of the vehicle; and performing a sub-level of authentication, with the extracted EDN and the EDN value stored in the computing unit.

16. The method of claim 15, wherein performing the first level two-way authentication of the at least one end device, comprising:

a first way of authenticating the at least one end device by a computing unit of the vehicle, wherein the computing unit is coupled to each of the at least one end device; and a second way of authenticating the vehicle by at least one end device.

17. A system for performing onboarding of at least one end device of a vehicle, comprising:

a computing unit of the vehicle;

at least one end device coupled to the computing unit; and an Original Equipment Manufacturer (OEM) cloud coupled to the vehicle, wherein the system is configured to:

perform a multi-level authentication of the at least one end device, by:

performing a first level two-way authentication between the vehicle and the at least one end device, comprises:

exchanging encrypted messages between the at least one end device and the vehicle, wherein the encrypted messages comprise:

an EndDeviceNonce (EDN) value and a vehicle nonce (VN) value that are stored in both the at least one end device and the vehicle;

performing a second level authentication of the at least one end device, through the vehicle, by the OEM cloud, comprises:

communicating:

(i) a serial number (SN) of the at least one end device from the vehicle to the OEM cloud;

(ii) a vehicle identification number (VIN) of the vehicle to the OEM cloud; and determining by the OEM cloud if the SN is valid for the VIN;

performing a third level authentication of the at least one end device, by the OEM cloud; and upon performing the multi-level authentication of the at least one end device, install software components related to at least one end device from the OEM cloud to the vehicle based on determining availability of the software components or the software update in the OEM cloud for onboarding the at least one end device in the vehicle.

* * * * *